(12) United States Patent
Lius et al.

(10) Patent No.: US 11,682,338 B2
(45) Date of Patent: Jun. 20, 2023

(54) ELECTRONIC DEVICE HAVING DISPLAY FUNCTION AND HAVING CONNECTION LINE DISPOSED ON SIDE SURFACE OF SUBSTRATE

(71) Applicant: InnoLux Corporation, Miao-Li County (TW)

(72) Inventors: Chandra Lius, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/699,193

(22) Filed: Mar. 21, 2022

(65) Prior Publication Data
US 2022/0207906 A1 Jun. 30, 2022

Related U.S. Application Data

(63) Continuation of application No. 16/861,186, filed on Apr. 28, 2020, now abandoned.

(60) Provisional application No. 62/842,537, filed on May 3, 2019.

(30) Foreign Application Priority Data

Mar. 6, 2020 (CN) .......................... 202010151871.9

(51) Int. Cl.
| | | |
|---|---|---|
| *G06F 3/042* | (2006.01) | |
| *G09G 3/20* | (2006.01) | |
| *G06F 3/041* | (2006.01) | |
| *G06V 40/13* | (2022.01) | |
| *G09G 3/36* | (2006.01) | |
| *G02F 1/1333* | (2006.01) | |

(52) U.S. Cl.
CPC ......... *G09G 3/2092* (2013.01); *G06F 3/0412* (2013.01); *G06F 3/0416* (2013.01); *G06V 40/13* (2022.01); *G02F 1/13338* (2013.01); *G09G 3/36* (2013.01); *G09G 2300/0408* (2013.01); *G09G 2300/0426* (2013.01); *G09G 2380/02* (2013.01)

(58) Field of Classification Search
CPC ..... G06F 3/0412; G06F 3/0416; G06V 40/13; G02F 1/13338; G09G 3/2092; G09G 3/36; G09G 2300/0408; G09G 2300/0426; G09G 2380/02
See application file for complete search history.

(56) References Cited

U.S. PATENT DOCUMENTS

2009/0141004 A1* 6/2009 Yamazaki ............... G06F 3/042
                                                             345/204
2018/0089485 A1* 3/2018 Bok ........................ G06F 3/044
(Continued)

*Primary Examiner* — Adam J Snyder
(74) *Attorney, Agent, or Firm* — Winston Hsu

(57) ABSTRACT

An electronic device includes a display panel, an integrated circuit and a connection line. The display panel includes a first substrate, a second substrate, a display component and a sensing unit, the second substrate is opposite to the first substrate, the display component is disposed on an inner surface of the first substrate, and the sensing unit is disposed on an inner surface the second substrate. The integrated circuit is for driving the display component and the sensing unit. The connection line is disposed on a side surface of the second substrate. The sensing unit is electrically connected with the integrated circuit through the connection line.

20 Claims, 14 Drawing Sheets

(56) References Cited

U.S. PATENT DOCUMENTS

2019/0025620 A1\* 1/2019 Tuan ........................ G02F 1/136
2019/0196632 A1\* 6/2019 Ryu ......................... G06F 3/044

\* cited by examiner

ELECTRONIC DEVICE HAVING DISPLAY FUNCTION AND HAVING CONNECTION LINE DISPOSED ON SIDE SURFACE OF SUBSTRATE

CROSS REFERENCE TO RELATED APPLICATIONS

This application is a continuation application of U.S. application Ser. No. 16/861,186, filed on Apr. 28, 2020, which claims the benefit of U.S. Provisional Application No. 62/842,537, filed on May 3, 2019. The contents of these applications are incorporated herein by reference.

BACKGROUND OF THE DISCLOSURE

1. Field of the Disclosure

The present disclosure relates to an electronic device, and more particularly to an electronic device having a display function and a biometric function (such as identification of a fingerprint and/or a palm print).

2. Description of the Prior Art

Generally, a biometric function (such as identification of a fingerprint and/or a palm print) may be used for identity identification. Nowadays, industries make effort integrating a sensor of the biometric feature in an electronic device, so as to advantage the yield rate and/or the characteristics of the electronic device.

SUMMARY OF THE DISCLOSURE

According to an embodiment, the present disclosure provides an electronic device including a display panel, an integrated circuit and a connection line. The display panel includes a first substrate, a second substrate, a display component and a sensing unit, the second substrate is opposite to the first substrate, the display component is disposed on an inner surface of the first substrate, and the sensing unit is disposed on an inner surface the second substrate. The integrated circuit is for driving the display component and the sensing unit. The connection line is disposed on a side surface of the second substrate. The sensing unit is electrically connected with the integrated circuit through the connection line.

DETAILED DESCRIPTION

Figure 1:
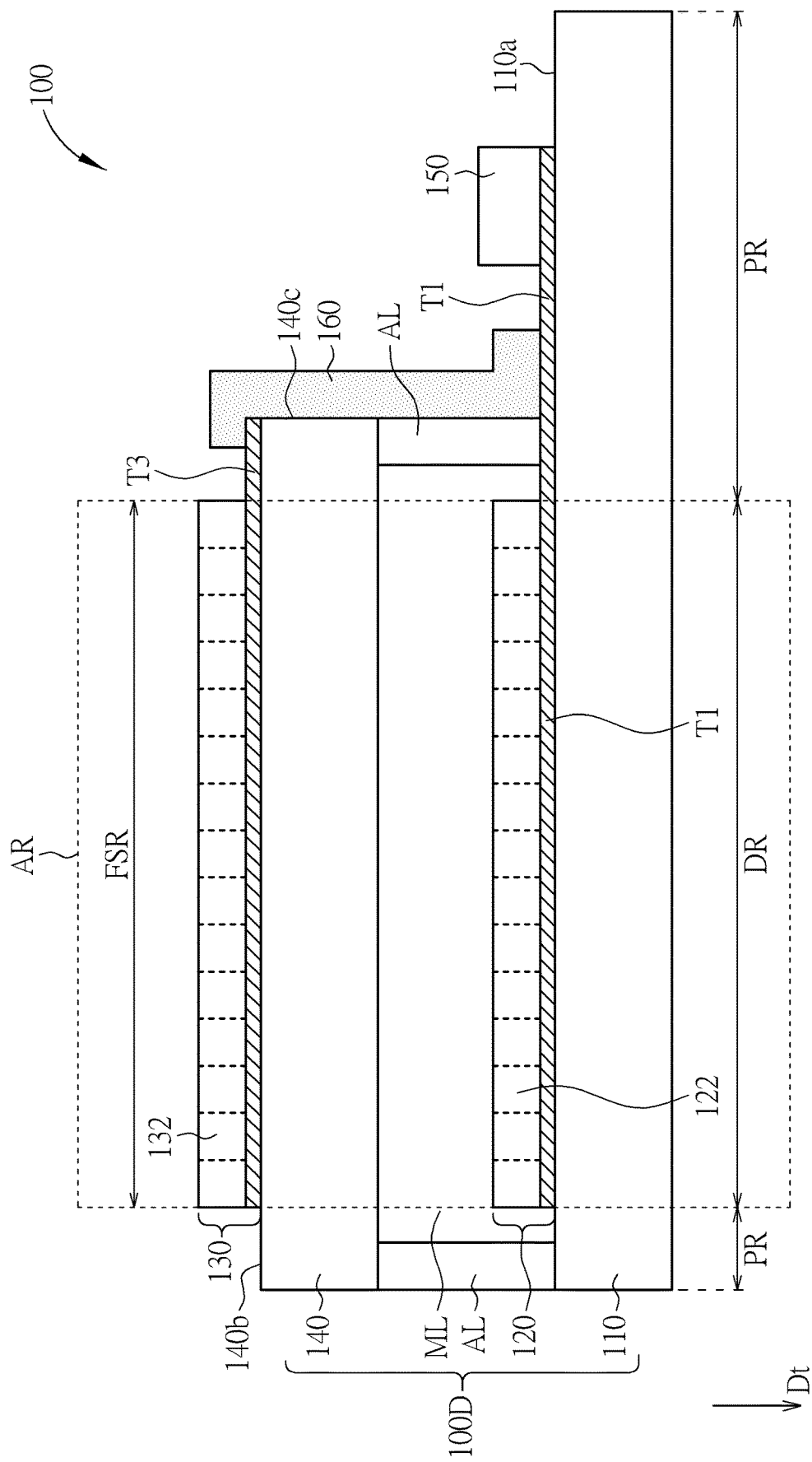
FIG. 1 is a schematic diagram showing a cross-sectional view of an electronic device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of an electronic device in this disclosure, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to "on another component", it may be directly on this another component, or other component(s) may exist between them. On the other hand, when the component is referred to "directly on another component (or the variant thereof)", any component does not exist between them. Furthermore, when the corresponding component is referred to "on another component", the corresponding component and the another component have a disposition relationship along a top-view direction, the corresponding component may be below or above the another component, and the disposition relationship along the top-view direction are determined by an orientation of the device.

It will be understood that when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented. In addition, when the component is referred to "be coupled to/with another component (or the variant thereof)", it may be directly connected to this another component, or may be indirectly connected (such as electrically connected) to this another component through other component(s).

The terms "about", "substantially", "equal", or "same" generally mean within 20% of a given value or range, or mean within 10%, 5%, 3%, 2%, 1%, or 0.5% of a given value or range.

Although terms such as first, second, third, etc., may be used to describe diverse constituent elements, such constituent elements are not limited by the terms. These terms are used only to discriminate a constituent element from other constituent elements in the specification, and these terms have no relation to the manufacturing order of these constituent components. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

In the present disclosure, the electronic device may optionally include a display function, a sensing function, a touch sensing function, an antenna function, a light emitting function, other suitable function or a combination thereof, but not limited thereto. In some embodiments, the electronic device may include a tiled device, but not limited thereto. The electronic device may include liquid crystal (LC) molecules, an organic light-emitting diode (OLED), an inorganic light-emitting diode (LED) such as a micro-LED and/or a mini-LED, quantum dots (QDs) material, a quantum-dot light-emitting diode (QLED, QDLED), fluorescence material, phosphor material, other suitable material or a combination thereof, but not limited thereto. Moreover, the electronic device (such as display device) may include a color display panel or a monochrome display panel, and a shape of the electronic device may be a rectangle, a circle, a polygon, a shape having a curved edge or other suitable shape, but not limited thereto. In the following, in order to explain exemplarily, the electronic device includes a liquid crystal color display panel as an example, but the electronic device is not limited thereto. In some embodiments, the electronic device may include an OLED display panel, a LED display panel, a QLED display panel or other suitable display panel.

Referring to FIG. 1, FIG. 1 is a schematic diagram showing a cross-sectional view of an electronic device according to a first embodiment of the present disclosure. As shown in FIG. 1, the electronic device 100 may include an active region AR, wherein the active region AR may optionally include a display region, a fingerprint sensing region, a light emitting region, a touch sensing region and/or a working region based on the use of the electronic device 100, but not limited thereto. For instance, the electronic device 100 shown in FIG. 1 includes a liquid crystal display panel, and the active region AR may include a display region DR of the liquid crystal display panel and a fingerprint sensing region FSR, but not limited thereto. Furthermore, in FIG. 1, for example, the electronic device 100 may further include a peripheral region PR of the liquid crystal display panel, and the peripheral region PR may be adjacent to or surround the active region AR.

The display region DR of the electronic device 100 may include a plurality of pixels, and each pixel may include at least one sub-pixel. That is to say, the display region DR is a region containing light emitting portions of all of the pixels for example. In some embodiments, for instance, one pixel may include three sub-pixels, such as a green sub-pixel, a red sub-pixel and a blue sub-pixel, but not limited thereto. The number and the color of the sub-pixels included in the pixels may be changed based on requirement(s). The number of the pixels, the arrangement of the pixels, the number of the sub-pixels and the arrangement of the sub-pixels may be adjusted based on requirement(s). For instance, the sub-pixels may be arranged in matrix, stripe type, staggered type or any other suitable arrangement. In addition, the top-view shape of the light emitting portion of the sub-pixel may be a rectangle, a parallelogram, a chevron, a shape having a curved edge or other suitable shape. The top-view shape of the light emitting portion of the sub-pixel may be determined by an opening of a light shielding layer, and this content will be explained later.

As shown in FIG. 1, the electronic device 100 may include a first substrate 110 and a second substrate 140, and the first substrate 110 and the second substrate 140 are opposite and overlap with each other along a normal direction Dt of the first substrate 110. The first substrate 110 and the second substrate 140 are connected by an adhesive structure AL, such that a space where other components/structures may be disposed is formed between the first substrate 110 and the second substrate 140. The first substrate 110 and the second substrate 140 may individually include such as a rigid substrate, a soft substrate or a flexible substrate. The rigid substrate may include such as glass, quartz, ceramic, sapphire, other suitable material or a combination thereof, but not limited thereto. The soft substrate and the flexible substrate may include such as polyimide (PI), polyethylene terephthalate (PET), other suitable material or a combination thereof, but not limited thereto. In some embodiments, the material of the first substrate 110 and the material of the second substrate 140 may be the same or different. In some embodiments, the first substrate 110 and the second substrate 140 may be the rigid substrate or the flexible substrate individually. In some embodiments, the first substrate 110 and the second substrate 140 are fixed by the adhesive structure AL, and the adhesive structure AL may include sealant and/or and other suitable adhesive material, but not limited thereto.

Note that, in some embodiments (as shown in FIG. 1), the display panel 100D of the electronic device 100 may include the first substrate 110, the second substrate 140, the components/structures disposed on the first substrate 110 and the components/structures disposed on the second substrate 140, but not limited thereto. In some embodiments, the display panel 100D of the electronic device 100 may include the first substrate 110 and the components/structures disposed on the first substrate 110. In the following, some components and structures are described in detail, and the electronic device 100 may include a portion of them or all of them based on requirement(s).

As shown in FIG. 1, a display component layer 120 is disposed on an inner surface 110a of the first substrate 110. The inner surface 110a faces to the second substrate 140. Therefore, the display component layer 120 is disposed between the first substrate 110 and the second substrate 140. The display component layer 120 may include at least one conductive layer, at least one insulating layer, at least one semiconductor layer, other layer or a combination thereof, so as to form a multi-layer structure. The display component layer 120 (e.g., the multi-layer structure) may include a plurality of display components 122 contained in the sub-pixels, and the display component may be or may include such as a light emitting component (e.g., any type of light-emitting diode), a pixel electrode, a common electrode or other suitable component. The material of the conductive layer may include metal, transparent conductive material (such as indium tin oxide (ITO), indium zinc oxide (IZO), etc.), other suitable conductive material or a combination thereof. The material of the insulating layer may include such as silicon oxide ($SiO_x$), silicon nitride ($SiN_y$), silicon oxynitride ($SiO_xN_y$), polymethylmetacrylate (PMMA), other suitable insulating material or a combination thereof. The material of the semiconductor layer may include such as poly-silicon, amorphous silicon, metal-oxide semiconductor (e.g., IGZO), other suitable semiconductor material or a combination thereof, but not limited thereto.

The display component layer 120 can include a plurality of display switching components (not shown), and each display switching component is electrically connected to the display component 122 of the sub-pixels. The display switching component may be a thin film transistor (TFT) or other suitable switch, wherein the type of the thin film transistor may be such as a top gate thin film transistor, a bottom gate thin film transistor, a dual gate thin film transistor or other suitable transistor. Optionally, the display component layer 120 can include other electronic component (such as a capacitor, etc.). The electrical connections of the display components 122, the display switching components and other electronic component may be adjusted based on designed requirement(s). As an example, one pixel electrode and one display switching component may be disposed in the sub-pixel of the liquid crystal display panel, and one capacitor may be optionally disposed in the sub-pixel, but not limited thereto. As another example, in some embodiments (e.g., the electronic device 100 includes another type of the display panel), the circuit in the sub-pixel may include a circuit scheme containing two transistors and one capacitor or other suitable circuit scheme.

The electronic device 100 may include a plurality of conductive lines, wherein each conductive line may include one conductive layer or more conductive layers. In FIG. 1, the plurality of conductive lines may include a plurality of first conductive lines T1 disposed on the inner surface 110a of the first substrate 110, and each of the first conductive lines T1 may be electrically connected to the component(s) in the display component layer 120, such as the display component 122, the display switching components and/or the capacitor, etc. In some embodiments, the plurality of conductive lines may further include a plurality of second conductive lines (not shown in figures) disposed on the inner surface 110a of the first substrate 110, and each of the second conductive lines may be electrically connected to the component(s) in the display component layer 120, such as the display component 122, the display switching components and/or the capacitor, etc. In some embodiments, the first conductive line T1 may be electrically connected to a terminal of the display switching component, such as a source (i.e., the first conductive line T1 may serve as a display data line), and the second conductive line may be electrically connected to another terminal of the display switching components, such as a gate (i.e., the second conductive line may serve as a display scan line), but not limited thereto. In some embodiments, the first conductive lines T1 may be substantially parallel to each other, the second conductive lines may be substantially parallel to each other, and the first conductive lines T1 may not be parallel to the second conductive lines. For instance, the first conductive lines T1 may be perpendicular to the second conductive lines substantially, but not limited thereto.

In some embodiments, the first conductive line T1 may be formed simultaneously with at least a part of one component in the display component layer 120, and/or the second conductive line may be formed simultaneously with at least a part of one component in the display component layer 120. In some embodiments, the first conductive line T1 and one terminal of the display switching component (e.g., the source) may be formed simultaneously by the same manufacturing process, and the second conductive line and another terminal of the display switching component (e.g., the gate) may be formed simultaneously by the same manufacturing process, but not limited thereto. In some embodiments, the first conductive line T1 may be electrically connected to one terminal (e.g., the source) of the display switching component through a connecting structure, and/or the second conductive line may be electrically connected to another terminal (e.g., the gate) of the display switching component through another connecting structure, but not limited thereto.

Moreover, in some embodiments, the first conductive line T1 may be electrically connected to the gate of the display switching component to be the display scan line, and the second conductive line may be electrically connected to the source of the display switching component to be the display data line. That is to say, the terminal of the display switching component electrically connected to the first conductive line T1 and the terminal of the display switching component electrically connected to the second conductive line may be exchanged, but not limited thereto.

The electronic device 100 may include a fingerprint sensing component layer 130 configured to sense the biometric feature (for example, the fingerprint), wherein the disposed position of the fingerprint sensing component layer 130 may be adjusted based on the requirement(s). In some embodiments (as shown in FIG. 1), the fingerprint sensing component layer 130 may be disposed on the second substrate 140, but not limited thereto. In some embodiments (as shown in FIG. 1), the fingerprint sensing component layer 130 may be disposed on a surface of the second substrate 140, which is opposite to the first substrate 110 and is referred as an outer surface 140b of the second substrate 140. That is to say, the second substrate 140 is disposed between the fingerprint sensing component layer 130 and the first substrate 110, but not limited thereto. A size of the fingerprint sensing region FSR of the active region AR may be determined by the fingerprint sensing component layer 130, wherein the fingerprint sensing region FSR may overlap or not overlap the display region DR, and the size of the fingerprint sensing region FSR may be greater than, less than or equal to the size of the display region DR. For instance, in some embodiments (as shown in FIG. 1), the fingerprint sensing region FSR may overlap the display region DR, and the size of the fingerprint sensing region FSR may be equal to the size of the display region DR, but not limited thereto. Moreover, the fingerprint sensing component layer 130 may include at least one conductive layer, at least one insulating layer, at least one semiconductor layer, any other suitable layer or a combination thereof, so as to form component(s) in the fingerprint sensing component layer 130, wherein the material of the conductive layer, the material of the insulating layer and the material of the semiconductor layer in the fingerprint sensing component layer 130 are similar to the display component layer 120, and thus, these contents will not be redundantly described.

The fingerprint sensing component layer 130 may include at least one fingerprint sensing unit 132 serving as fingerprint sensor(s) to sense the biometric feature (e.g., the fingerprint), thereby obtaining a profile of the biometric feature (such as fingerprint ridges, fingerprint valleys and/or minutiae of the fingerprint). In the present disclosure, the type of the fingerprint sensor is not limited. For instance, the type of the fingerprint sensor may be a capacitive fingerprint sensor, an optical fingerprint sensor, an ultrasonic fingerprint sensor or a fingerprint sensor with other suitable type. In some embodiments using the capacitive fingerprint sensor, the fingerprint sensing unit 132 may include such as an electrode, a capacitor or other suitable capacitor sensing unit, such that when the fingerprint sensing unit 132 senses, a capacitance of a corresponding region of the biometric feature (e.g., the fingerprint) is obtained, and the biometric feature identification may be processed according to the differences of the capacitances of all sensing regions (i.e., a capacitance corresponding to a fingerprint ridge region is different from a capacitance corresponding to a fingerprint valley region), but not limited thereto. In some embodiments using the optical fingerprint sensor, the fingerprint sensing unit 132 may include a PIN diode (having a P-type semiconductor layer, an intrinsic layer and an N-type semiconductor layer) or other suitable photoelectric conversion unit, and the biometric feature identification may be performed according to light intensity of reflective light reflected from the biometric feature and received by the fingerprint sensing unit 132 during sensing period (e.g., the light intensities of the light reflected from the fingerprint ridge and the light reflected from the fingerprint valley are different), but not limited thereto. In some embodiments using the ultrasonic fingerprint sensor, the fingerprint sensing unit 132 may include such as an ultrasonic receiving generating unit, which includes two electrodes and a piezoelectric layer sandwiched between these two electrodes, but not limited thereto. In the sensing process, a suitable voltage difference may be applied on two electrodes of the ultrasonic receiving generating unit to deform the piezoelectric layer (e.g., rapid vibration) for generating an ultrasonic wave, and the ultrasonic wave may be reflected to be a reflective ultrasonic wave with corresponding intensity based on the profile of the biometric feature (e.g., the intensities of the reflective ultrasonic wave of the fingerprint ridge and the reflective ultrasonic wave of the fingerprint valley are different). Then, the piezoelectric layer of the ultrasonic receiving generating unit may correspondingly deform (e.g., rapid vibration) after receiving the reflective ultrasonic wave, thereby generating a voltage difference between the two electrodes. Finally, the biometric feature identification may be performed according to the differences of the generated voltage differences (the generated voltage difference corresponding to the fingerprint ridge region is different from the generated voltage difference corresponding to the fingerprint valley region), but not limited thereto.

The fingerprint sensing component layer 130 may optionally include at least one sensing switching component (not shown in FIG. 1) electrically connected to the fingerprint sensing unit 132. The connection between the sensing switching component and the fingerprint sensing unit 132 may be determined based on the sensing method and other requirement(s). In some embodiments, the sensing switching component may be a thin film transistor or other suitable switching component. Furthermore, the fingerprint sensing component layer 130 may optionally include other needed electronic component.

In FIG. 1, the plurality of conductive lines may include a plurality of third conductive lines T3 disposed on the second substrate 140, and each of the third conductive lines T3 is electrically connected to the component(s) in the fingerprint sensing component layer 130, such as the fingerprint sensing unit 132 and/or the sensing switching component, etc. In some embodiments, the plurality of conductive lines may include a plurality of fourth conductive lines (not shown in figures) disposed on the second substrate 140, and each of the fourth conductive lines is electrically connected to the component(s) in the fingerprint sensing component layer 130, such as the fingerprint sensing unit 132 and/or the sensing switching component, etc. In some embodiments, the third conductive line T3 may be electrically connected to a terminal of the sensing switching component, such as a source (i.e., the third conductive line T3 may serve as a sensing data line), and the fourth conductive line may be electrically connected to another terminal of the sensing switching component, such as the gate (i.e., the fourth conductive lines may serve as a sensing scan line), but not limited thereto. In some embodiments, the third conductive lines T3 may be substantially parallel to each other, the fourth conductive lines may be substantially parallel to each other, and the third conductive lines T3 may not be parallel to the fourth conductive lines. For instance, the third conductive lines T3 may be perpendicular to the fourth conductive lines substantially, but not limited thereto.

In some embodiments, the third conductive line T3 may be formed simultaneously with at least apart of one component in the fingerprint sensing component layer 130, and/or the fourth conductive line may be formed simultaneously with at least a part of one component in the fingerprint sensing component layer 130. In some embodiments, the third conductive line T3 and one terminal (e.g., the source) of the sensing switching component may be formed simultaneously by the same manufacturing process, the fourth conductive line and another terminal (e.g., the gate) of the sensing switching component may be formed simultaneously by the same manufacturing process, but not limited thereto. In some embodiments, the third conductive line T3 may be electrically connected to one terminal (e.g., the source) of the sensing switching component through a connecting structure, and/or the fourth conductive line may be electrically connected to another terminal (e.g., the gate) of the sensing switching component through another connecting structure, but not limited thereto.

Moreover, in some embodiments, the third conductive line T3 may be electrically connected to the gate of the sensing switching component to be the sensing scan line, and the fourth conductive line may be electrically connected to the source of the sensing switching component to be the sensing data line. That is to say, the terminal of the sensing switching component electrically connected to the third conductive line T3 and the terminal of the sensing switching component electrically connected to the fourth conductive line may be exchanged, but not limited thereto.

The electronic device 100 may include a needed circuit disposed on the first substrate 110 and/or the second substrate 140. In some embodiments, as shown in FIG. 1, the electronic device 100 may include at least one integrated circuit (IC) 150 disposed on the peripheral region PR of the first substrate 110, and the integrated circuit 150 is electrically connected to the conductive lines to be coupled with other electronic component(s). In some embodiments, one integrated circuit 150 may be one chip where the electronic components provided with different functions are encapsulated. For example, the electronic component for driving the display component 122 and the electronic component for driving the fingerprint sensing unit 132 are encapsulated in one chip, but not limited thereto. In some embodiments, one integrated circuit 150 may be electrically connected to the display components 122 and the fingerprint sensing units 132, so as to drive the display components 122 in the display panel and drive the fingerprint sensing unit 132, thereby controlling the display image and the fingerprint identification of the electronic device 100 (i.e., this integrated circuit 150 may have a function for controlling the display image and a function for controlling the fingerprint identification at the same time). In this case, since the number of the integrated circuit 150 may be reduced, the thickness of the electronic device 100 may be decreased and/or the size of the peripheral region PR of the electronic device 100 may be decreased, but not limited thereto.

The first conductive line T1 may be electrically connected between the integrated circuit 150 and the display switching component, such that the integrated circuit 150 may be electrically connected to the display component 122 through the first conductive line T1 and the display switching component in sequence, but not limited thereto. Moreover, in order to make the integrated circuit 150 disposed on the first substrate 110 be electrically connected to the fingerprint sensing unit 132 on the second substrate 140, the electronic device 100 may further include at least one first connection line 160, and the first connection line 160 extends from the inner surface 110a of the first substrate 110 through the side surface 140c of the second substrate 140 to the outer surface 140b of the second substrate 140, so as to be an electrically connecting path between the electronic component on the first substrate 110 and the electronic component on the second substrate 140 (i.e., the first connection line 160 is a connection line between the electronic components on two substrates respectively). In some embodiments, the first connection line 160 is outside the adhesive structure AL. In addition, the electronic device 100 may further include at least one fifth conductive line (not shown in FIG. 1) disposed on the inner surface 110a of the first substrate 110. In some embodiments, at least a portion of the fifth conductive line and at least a portion of the first conductive line T1 may be formed simultaneously by the same manufacturing process, but not limited thereto. In some embodiments, the first conductive line T1 and the fifth conductive line belong to different conductive layers respectively. Regarding the electrical connection between the integrated circuit 150 and the fingerprint sensing unit 132, in FIG. 1, the first connection line 160 is connected between the fifth conductive line and the third conductive line T3, and the fifth conductive line is connected between the integrated circuit 150 and the first connection line 160. Therefore, the integrated circuit 150 may be electrically connected to the fingerprint sensing unit 132 through the fifth conductive line, the first connection line 160, the third conductive line T3 and the sensing switching component in sequence, but not limited thereto. As shown FIG. 1, the fingerprint sensing unit 132 may be electrically connected with the integrated circuit 150 on the first substrate 110 through the first connection line 160 (serving as a connection line) at the side surface 140c of the second substrate 140. In some embodiments, the connection between the fifth conductive lines and the first connection lines 160 may be one-to-one, but not limited thereto. Note that, a pad may be optionally disposed at an end of the third conductive line T3 to enhance an connecting area between the first connection line 160 and the third conductive line T3, and pads may be optionally disposed at two ends of the fifth conductive line to enhance an connecting area between the integrated circuit 150 and the fifth conductive line and a connecting area between the first connection line 160 and the fifth conductive line, thereby increasing the reliability of the electrical connection, but not limited thereto. In addition, the first connection line 160 is not in contact with the first conductive line T1 directly.

Moreover, the first connection line 160 may include any suitable conductive material, such as transparent conductive material (e.g., indium tin oxide and/or indium zinc oxide), metal, conductive adhesive (e.g., silver paste) or other suitable material or a combination thereof, but not limited thereto. In some embodiments, a patterned first connection line 160 may be formed by printing, coating or adhering, but not limited thereto. In addition, since the first connection line 160 may be formed by printing, coating or adhering, the resolution (such as a line width) of the first connection line 160 may be restricted (for example, the lower resolution and/or the greater line width). Accordingly, in some embodiments, the electronic device 100 may optionally include a demultiplexer (DEMUX) disposed on the second substrate 140 and electrically connected between the third conductive line T3 and the first connection line 160. Since the demultiplexer may make one first connection line 160 provide signals for different third conductive lines T3 in different times, or make different third conductive lines T3 provide signals for one first connection line 160 in different times, the number of the first connection line(s) 160 may be less than the number of the third conductive lines T3. In some embodiments, the electronic device 100 may not have the demultiplexer, and the number of the first connection lines 160 may be equal to the number of the third conductive lines T3, but not limited thereto.

The electronic device 100 may optionally include another circuit disposed on the second substrate 140. For instance, the electronic device 100 may optionally include a signal amplifying circuit electrically connected to the third conductive line T3, so as to amplify the sensing signal generated from the fingerprint sensing unit 132, but not limited thereto. In some embodiments, this circuit or other circuit may be integrated in the integrated circuit 150 having the function for controlling the fingerprint identification.

The circuits in the electronic device 100 may include a first gate driving circuit disposed on the first substrate 110, and the first gate driving circuit is electrically connected to the gates of the display switching components of the display component layer 120 through the second conductive lines, so as to drive the display switching components, but not limited thereto. In some embodiments, the first gate driving circuit may be electrically connected to the gates of the display switching components of the display component layer 120 through the first conductive lines T1. The circuits in the electronic device 100 may optionally include a second gate driving circuit disposed on the second substrate 140, and the second gate driving circuit is electrically connected to the gates of the sensing switching components of the fingerprint sensing component layer 130 through the fourth conductive lines, so as to drive the sensing switching component, but not limited thereto. In some embodiments, the second gate driving circuit may be electrically connected to the gates of the sensing switching components of the fingerprint sensing component layer 130 through the third conductive lines T3.

In some embodiments, when the first substrate 110 is the soft substrate or the flexible substrate, a part of the first substrate 110 may be folded, so as to make at least a portion of the peripheral region PR be folded to such as the back of the active region AR or the back of another portion of the peripheral region PR (i.e., at least a portion of the peripheral region PR is folded downwardly in FIG. 1), thereby forming a front board portion and a back board portion. For instance, in some embodiment (not shown in figures), the integrated circuit 150 disposed on the peripheral region PR may be folded downwardly, such that the integrated circuit 150 is disposed on the back board portion, but not limited thereto. In this case, the size of the border of the electronic device 100 may be reduced. Furthermore, in some embodiments, other component(s) of the electronic device 100, such as a battery, may be disposed between the front board portion and the back board portion of the first substrate 110 after the first substrate 110 is bent, but not limited thereto.

The electronic device 100 may further include any needed layer and/or structure. In some embodiments, the electronic device 100 includes the display panel 100D and a backlight module (not shown). The display panel 100D can be a liquid crystal display panel, and the backlight module can be disposed on a side of the first substrate 110 opposite to the second substrate 140 (i.e., the first substrate 110 is disposed between the backlight module and the second substrate 140). Note that, when the first substrate 110 is bent, the first substrate 110 may be optionally bent to a position below the backlight module, but not limited thereto. In some embodiments, the electronic device 100 may include a medium layer ML, and the medium layer ML includes such as a liquid crystal layer containing liquid crystal molecules. The medium layer ML is disposed between the first substrate 110 and the second substrate 140, and the display component 122 may adjust the rotation of the liquid crystal molecules of the liquid crystal layer based on the display signal, thereby controlling the transmittance of the backlight. The display component 122 can include a pixel electrode and a common electrode.

In some embodiments, the electronic device 100 may include the display panel 100D, and the electronic device 100 may further include a light converting layer (shown in the following figure), a light shielding layer (shown in the following figure), an optical layer, other suitable layer or a combination thereof. The light shielding layer may have a function of shielding light, and the light shielding layer may be disposed on the first substrate 110 or the second substrate 140 based on requirement(s). The light shielding layer may include such as black photoresist, black ink, black resin, pigment, dye, other suitable material or a combination thereof, and the light shielding layer may be a single-layer structure or a multi-layer structure. For instance, the light shielding layer is configured to shield the lower components (e.g., the switching components and/or the conductive lines), or reduce the probability that the external light is reflected by the component(s) in the electronic device 100 (e.g., the switching components and/or the conductive lines), but not limited thereto. In some embodiments, the light shielding layer has a plurality of openings, and each opening is configured to define the top-view shape of the sub-pixel. Therefore, the light shielding layer may be configured to separate the sub-pixels. In some embodiments, the light shielding layer may be configured to decrease the interference of the lights emitted from different sub-pixels.

The light converting layer is disposed within the opening of the light shielding layer, such that the light converting layer may be corresponding to one sub-pixel in the normal direction Dt. In some embodiments, compared with the component emitting the light (e.g., the light emitting component or the backlight module), the light converting layer is more adjacent to a light-emitting surface of the electronic device 100, such that the light converting layer may convert the color of the received light. In some embodiments, the light converting layer may include color filter, quantum dots (QD) material, fluorescence material, phosphorescence material, other suitable material or a combination thereof. Moreover, the light converting layers corresponding to different type sub-pixels may perform different light conversion. For instance, the light converting layer corresponding to the green sub-pixel may convert the incident light into the green light, the light converting layer corresponding to the red sub-pixel may convert the incident light into the red light, and the light converting layer corresponding to the blue sub-pixel may convert the incident light into the blue light, but not limited thereto. In some embodiments, the light converting layer may have a function of scattering light. For example, the light converting layer may include a plurality of light scattering particles.

The optical layer may include such as an anti-reflection film, a polarizer, other suitable film or a combination thereof, and the optical layer may be disposed at any suitable position. In some embodiments, the anti-reflection film may be disposed on the second substrate 140, but not limited thereto. In some embodiments, the electronic device 100 may include one or more polarizer(s), and each polarizer may be disposed on the first substrate 110 or the second substrate 140.

The electronic device 100 may further include a circuit board (not shown in figures) configured to receive signals from outside, or to transmit signals from the electronic device 100 to outside. For instance, in some embodiments, the circuit board may be bonded to the first substrate 110 or the second substrate 140 by welding, such that the circuit board is electrically connected to the electronic component (e.g., the integrated circuit 150) on the first substrate 110 and/or the second substrate 140. In some embodiments, by such as welding or other suitable method, an outer connecting structure may be disposed on the circuit board and electrically connected to the component(s) on the circuit board, such that the electronic device 100 may be electrically connected to an outer device through the circuit board and outer connecting structure on the circuit board. In addition, the circuit board may be a rigid circuit board, a soft circuit board or a flexible circuit board. In some embodiments, if the circuit board is the flexible circuit board, the circuit board may be bent for reducing the size of the electronic device 100.

The electronic device of the present disclosure is not limited to the above embodiments. Further embodiments of the present disclosure are described below. For ease of comparison, same components will be labeled with the same symbol in the following. The following descriptions relate the differences between each of the embodiments, and repeated parts will not be redundantly described.

Figure 2:
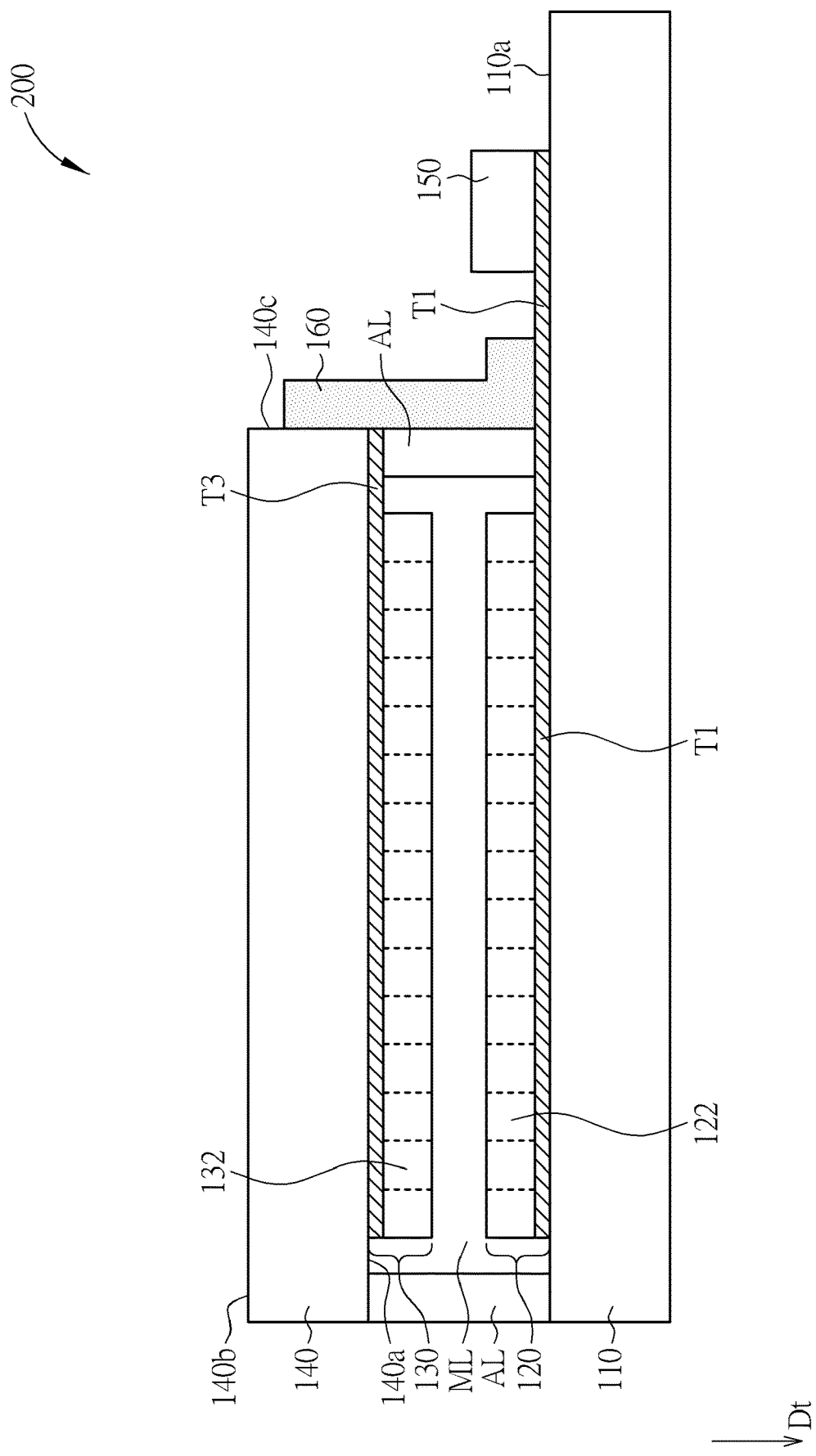
FIG. 2 is a schematic diagram showing a cross-sectional view of an electronic device according to a second embodiment of the present disclosure.

Referring to FIG. 2, FIG. 2 is a schematic diagram showing a cross-sectional view of an electronic device according to a second embodiment of the present disclosure. As shown in FIG. 2, a difference between the first embodiment and this embodiment is that the fingerprint sensing component layer 130, the third conductive lines T3 and the fourth conductive lines of the electronic device 200 of this embodiment is disposed on an inner surface 140a of the second substrate 140, which is close to the first substrate 110. In other words, the fingerprint sensing component layer 130, the third conductive lines T3 and the fourth conductive lines are disposed between the second substrate 140 and the first substrate 110. In addition, according to the design of this embodiment, the first connection line 160 may not need to extend to the outer surface 140b of the second substrate 140, but not limited thereto. Note that, in FIG. 2, the third conductive line T3 is electrically connected to the first connection line 160 at a position close to the side surface 140c of the second substrate 140, but not limited thereto.

Figure 3:
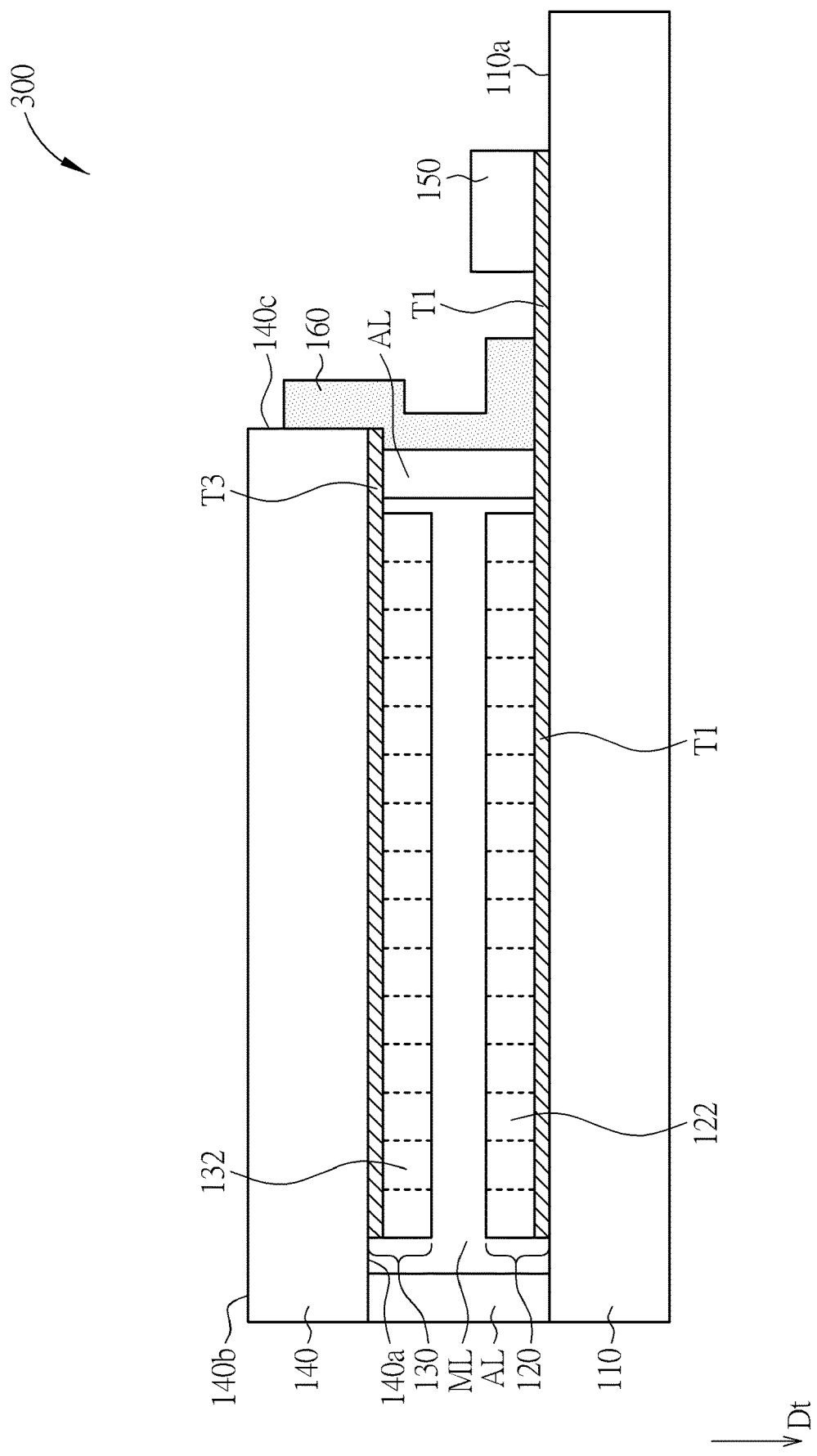
FIG. 3 is a schematic diagram showing a cross-sectional view of an electronic device according to a third embodiment of the present disclosure.

Referring to FIG. 3, FIG. 3 is a schematic diagram showing a cross-sectional view of an electronic device according to a third embodiment of the present disclosure. As shown in FIG. 3, a difference between the second embodiment and this embodiment is that the first connection line 160 of the electronic device 300 of this embodiment may extend inwardly to the inner surface 140a of the second substrate 140, so as to increase the contact area between the first connection line 160 and the third conductive line T3. In FIG. 3, the adhesive structure AL does not overlap the side surface 140c of the second substrate 140 in the normal direction Dt, such that a portion of the third conductive line T3 is exposed outside the adhesive structure AL, so as to increase the contact area between the first connection line 160 and the third conductive line T3.

Figure 4:
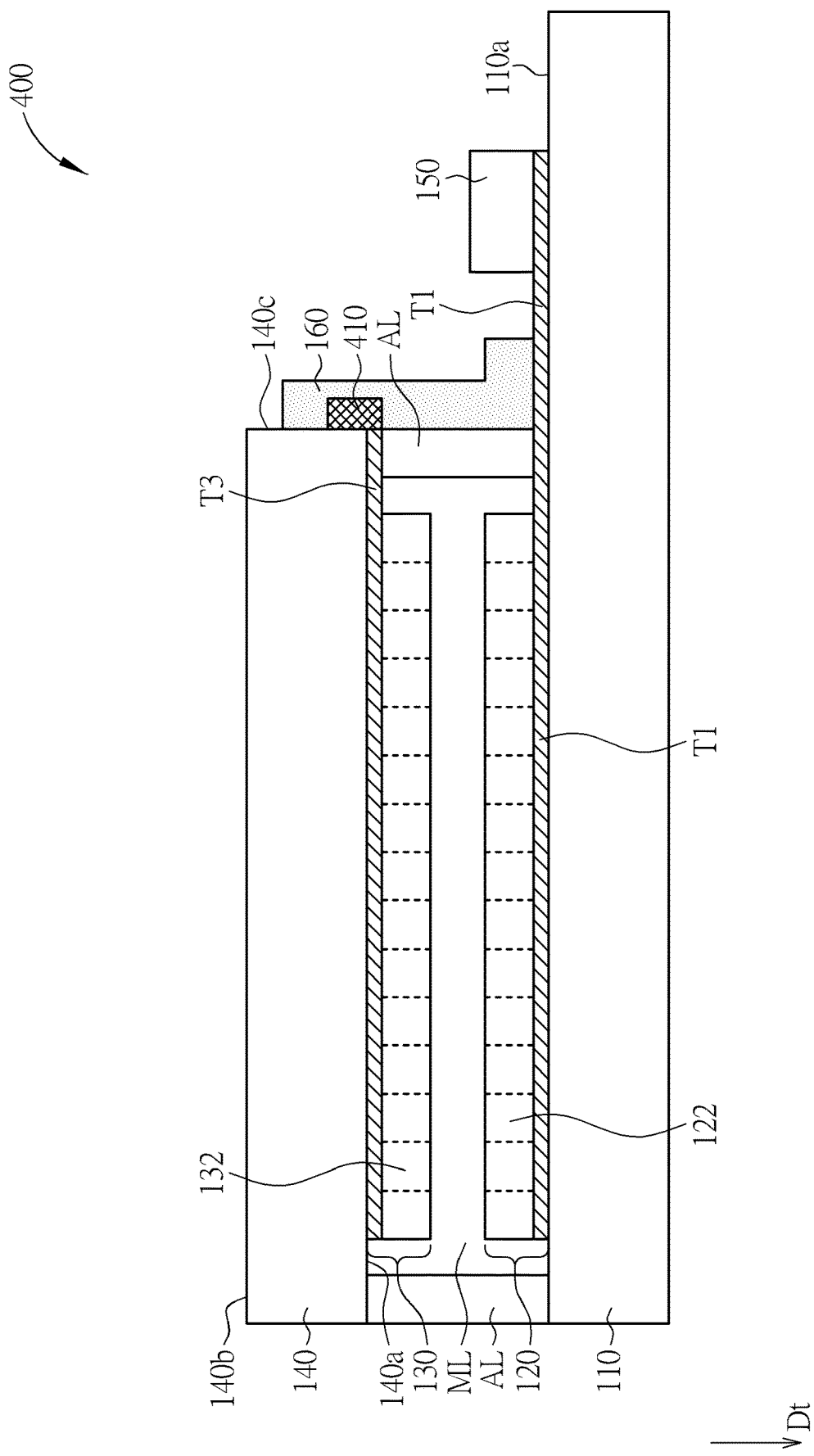
FIG. 4 is a schematic diagram showing a cross-sectional view of an electronic device according to a fourth embodiment of the present disclosure.

Referring to FIG. 4, FIG. 4 is a schematic diagram showing a cross-sectional view of an electronic device according to a fourth embodiment of the present disclosure. As shown in FIG. 4, a difference between the second embodiment and this embodiment is that the electronic device 400 of this embodiment further includes an interconnecting element 410 disposed on the side surface 140c of the second substrate 140, and the interconnecting element 410 is electrically connected between the first connection line 160 and the third conductive line T3. For example, the connection between the interconnecting elements 410 and the first connection lines 160 is one-to-one, but not limited thereto. In FIG. 4, for example, the first connection line 160 covers the interconnecting element 410, but not limited thereto. The interconnecting element 410 may be any suitable conductive material, such as transparent conductive material (e.g., indium tin oxide and/or indium zinc oxide), metal (e.g., aluminum, gold and/or silver), conductive adhesive (e.g., silver paste) or other suitable material or a combination thereof, but not limited thereto. In some embodiments, the material of the interconnecting element 410 may be the same as or different from the material of the first connection line 160. In some embodiments, the resistance of the material of the interconnecting element 410 may be less than the resistance of the material of the first connection line 160. Furthermore, in some embodiments, the interconnecting element 410 may be formed by printing, coating or adhering, but not limited thereto. In some embodiments, the interconnecting element 410 may be formed by a semiconductor process, but not limited thereto. Since the interconnecting element 410 is between the first connection line 160 and the third conductive line T3, the effect of the electrical connection between the first connection line 160 and the third conductive line T3 is enhanced (e.g., the reliability of the electrical connection is enhanced or the resistance is reduced).

Figure 5:
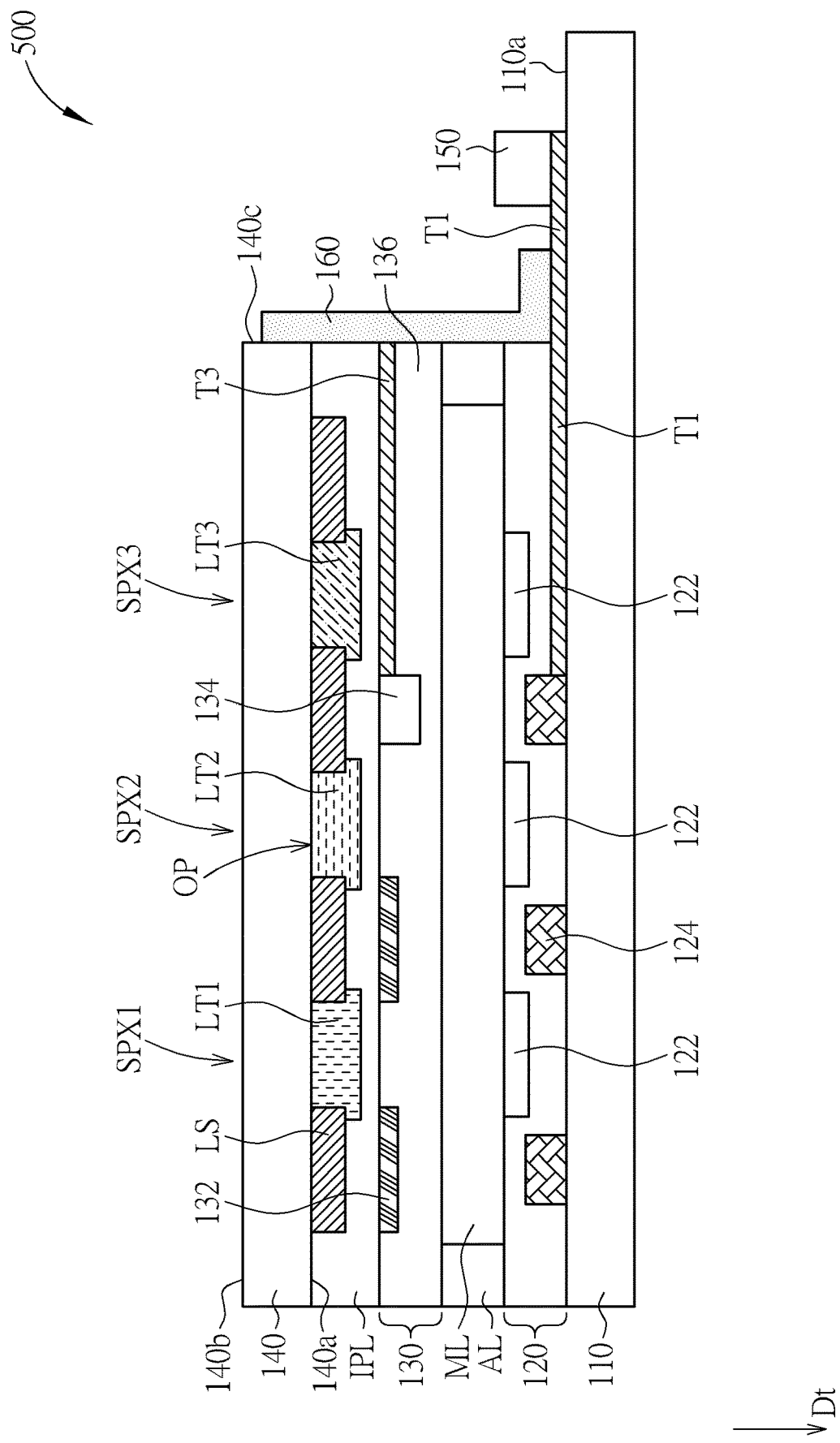
FIG. 5 is a schematic diagram showing a cross-sectional view of an electronic device according to a fifth embodiment of the present disclosure.
Figure 6:
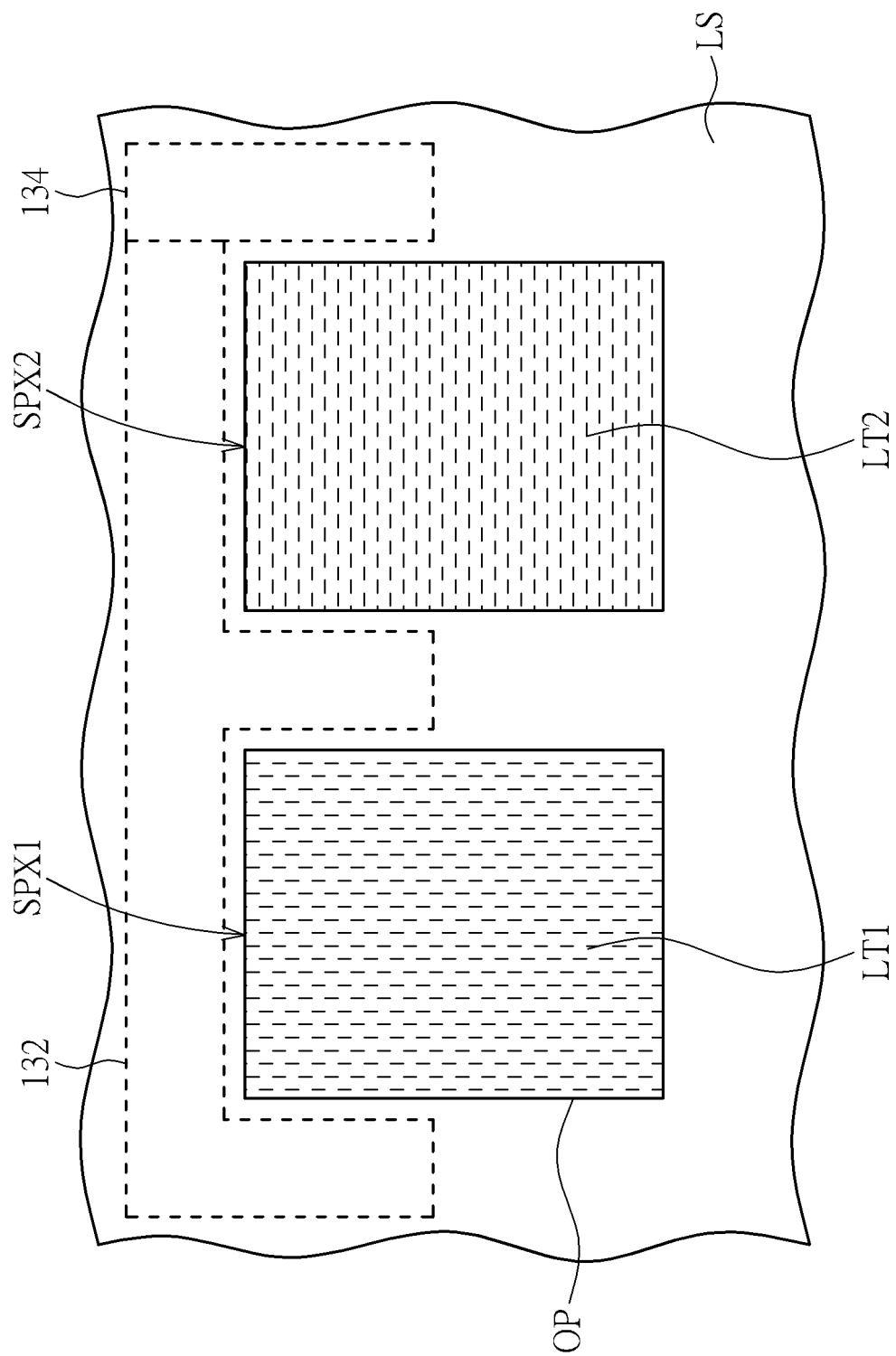
FIG. 6 is a schematic diagram showing a top view of a partial region of FIG. 5.

Referring to FIG. 5 and FIG. 6, FIG. 5 is a schematic diagram showing a cross-sectional view of an electronic device according to a fifth embodiment of the present disclosure, and FIG. 6 is a schematic diagram showing a top view of a partial region of FIG. 5, wherein FIG. 5 shows the sub-pixel SPX1, the sub-pixel SPX2, the sub-pixel SPX3, the display switching components 124, the sensing switching component 134, the fingerprint sensing unit 132, the light shielding layer LS, the light converting layer LT1, the light converting layer LT2 and the light converting layer LT3 described above, FIG. 6 shows the sub-pixel SPX1 and the sub-pixel SPX2 in FIG. 5, and FIG. 6 correspondingly shows the fingerprint sensing unit 132, the sensing switching component 134 and the light shielding layer LS shown in FIG. 5. As shown in FIG. 5 and FIG. 6, compared with the second embodiment shown in FIG. 2, FIG. 5 and FIG. 6 show more components and structures in the electronic device 500. In FIG. 5, the light shielding layer LS, the light converting layer LT1, the light converting layer LT2 and the light converting layer LT3 are disposed on the inner surface 140a of the second substrate 140, and the fingerprint sensing component layer 130 is disposed on the light shielding layer LS, the light converting layer LT1, the light converting layer LT2 and the light converting layer LT3 (i.e., the fingerprint sensing component layer 130 is disposed between the light shielding layer LS and the first substrate 110), but not limited thereto. The disposition of the layers may be adjusted based on requirement(s). In some embodiments, the fingerprint sensing component layer 130 may be disposed on the inner surface 140a of the second substrate 140, and the light shielding layer LS, the light converting layer LT1, the light converting layer LT2 and the light converting layer LT3 are disposed on the fingerprint sensing component layer 130 (i.e., the light shielding layer LS, the light converting layer LT1, the light converting layer LT2 and the light converting layer LT3 are disposed between the fingerprint sensing component layer 130 and the first substrate 110), but not limited thereto. In some embodiments, the light shielding layer LS, the light converting layer LT1, the light converting layer LT2 and the light converting layer LT3 are disposed on the first substrate 110, but not limited thereto. In addition, the electronic device 500 may optionally include an insulating protective layer IPL, so as to protect the covered component(s) or structure(s), wherein the insulating protective layer IPL may cover the light shielding layer LS, the light converting layer LT1, the light converting layer LT2 and the light converting layer LT3. Moreover, the fingerprint sensing component layer 130 may further include a protective layer 136 covering the sensing switching component 134, the fingerprint sensing unit 132 and/or the conductive line (e.g., the third conductive line T3 and/or the fourth conductive line), but not limited thereto. In some embodiments, the light shielding layer LS, the light converting layers LT1-LT3, the insulating protective layer IPL, and the fingerprint sensing component layer 130 are formed on the inner surface 140a of the second substrate 140 in sequence, but not limited thereto. The forming order may be adjusted based on the design of the layer stack. Note that since the sub-pixel SPX1, the sub-pixel SPX2 and the sub-pixel SPX3 in FIG. 5 emit the lights with different colors respectively, the light converting layers LT1-LT3 may generate the lights with different colors.

In FIG. 5, the light shielding layer LS may overlap and shield the display switching component 124, the sensing switching component 134, the conductive line and/or at least a portion of the fingerprint sensing unit 132 in the normal direction Dt, and the light converting layers LT1-LT3 are disposed within the openings OP. In the top view of FIG. 6, the fingerprint sensing unit 132 and the sensing switching component 134 are disposed around the light converting layer LT1, the light converting layer LT2 and the light converting layer LT3, and the sensing switching component 134 and at least a portion of the fingerprint sensing unit 132 overlap the light shielding layer LS in the normal direction Dt. Furthermore, in some embodiments, the light shielding layer LS may optionally have a sensing opening (not shown in figures) exposing a portion of the fingerprint sensing unit 132, such that the fingerprint sensing unit 132 may receive such as a light, an electromagnetic wave or a sound wave through the sensing opening, but not limited thereto. In addition, the corresponding relation between the fingerprint sensing units 132 and the sub-pixels, the density of the fingerprint sensing units 132 and the number of the fingerprint sensing units 132 may be adjusted based on the practical sensing requirement. For instance, one fingerprint sensing unit 132 may correspond to one sub-pixel, more sub-pixels, one pixel, or more pixels, but not limited thereto. In FIG. 6, one fingerprint sensing unit 132 corresponds to two sub-pixels (e.g., the sub-pixel SPX1 and the sub-pixel SPX2), but not limited thereto.

Figure 7:
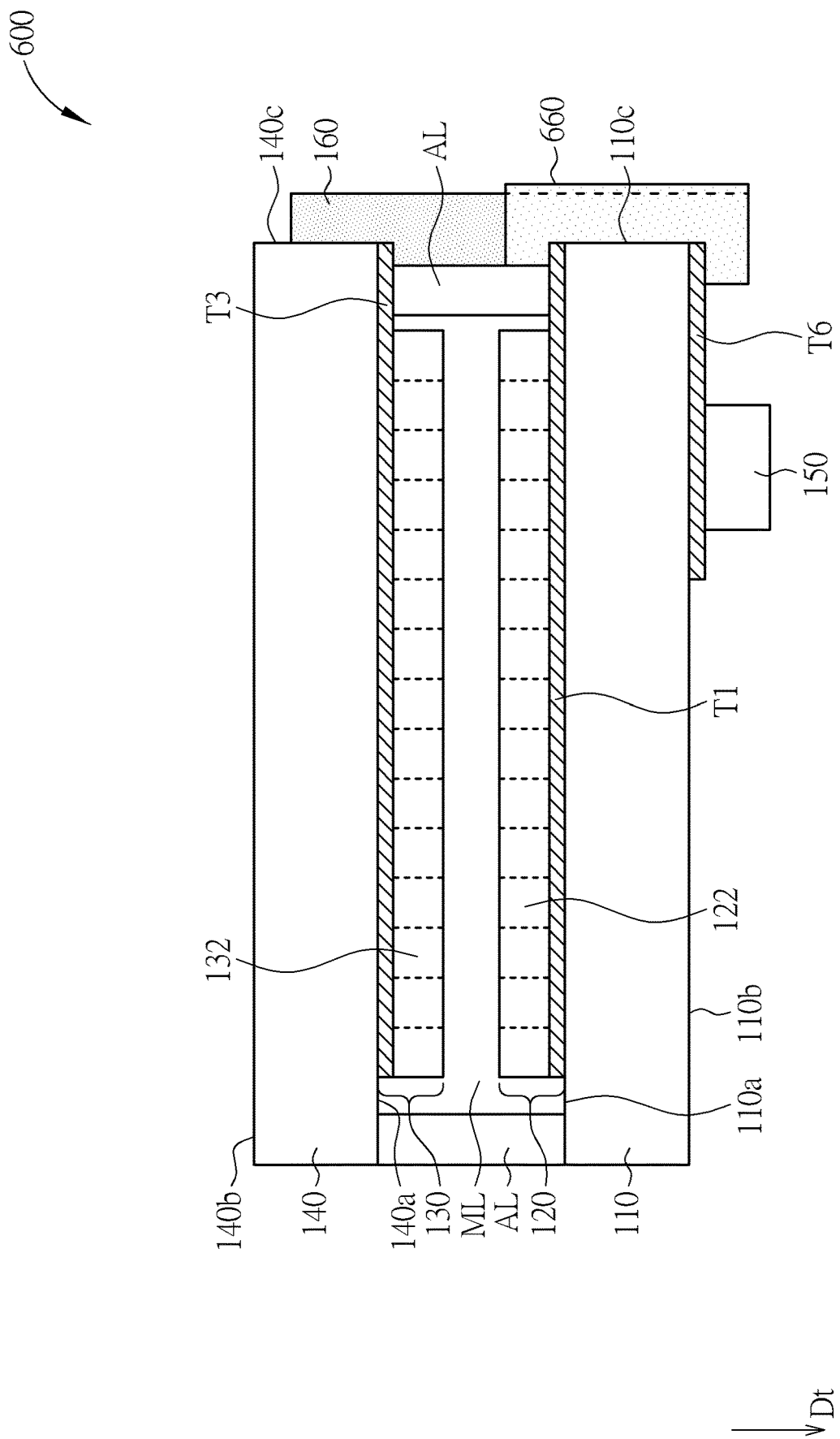
FIG. 7 is a schematic diagram showing a cross-sectional view of an electronic device according to a sixth embodiment of the present disclosure.
Figure 8:
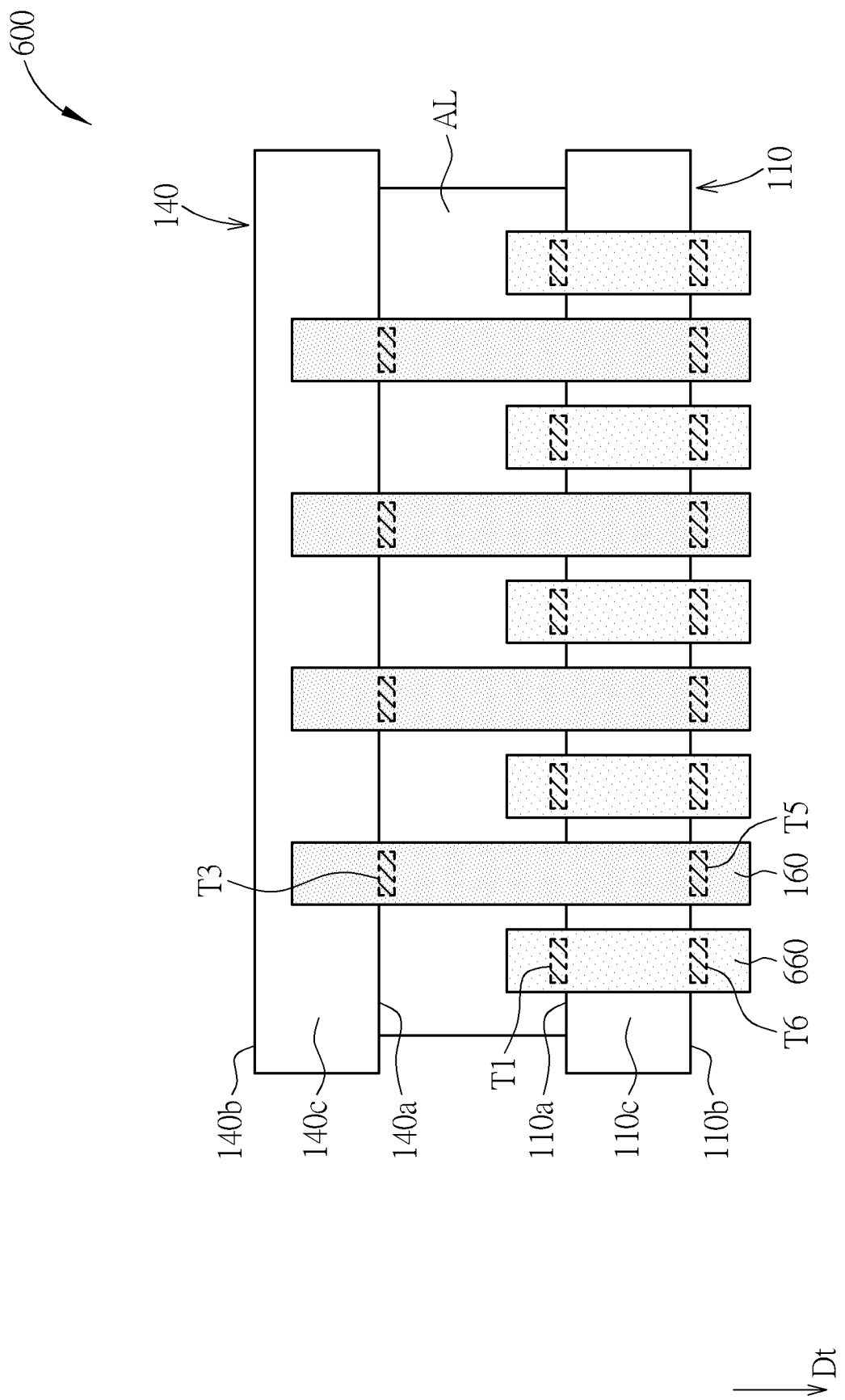
FIG. 8 is a schematic diagram showing a side view of the electronic device according to the sixth embodiment of the present disclosure.

Referring to FIG. 7 and FIG. 8, FIG. 7 is a schematic diagram showing a cross-sectional view of an electronic device according to a sixth embodiment of the present disclosure, and FIG. 8 is a schematic diagram showing a side view of the electronic device according to the sixth embodiment of the present disclosure. As shown in FIG. 7 and FIG. 8, a difference between the second embodiment and this embodiment is that the integrated circuit 150 and the fifth conductive lines T5 (as shown in FIG. 8) of the electronic device 600 of this embodiment may be disposed on a surface of the first substrate 110 opposite to the second substrate 140 (this surface is referred as an outer surface 110b of the first substrate 110), such that the size of the electronic device 600 may be reduced. In order to make the integrated circuit 150 be electrically connected to the electronic component(s) on the second substrate 140 (e.g., the fingerprint sensing unit 132 and the sensing switching component of the fingerprint sensing component layer 130), the first connection line 160 may extend from the side surface 140c of the second substrate 140 through the side surface 110c of the first substrate 110 to the outer surface 110b of the first substrate 110, so as to be connected to the fifth conductive line T5 disposed on the outer surface 110b of the first substrate 110. Thus, the electronic component on the second substrate 140 may be electrically connected to the integrated circuit 150 through the first connection line 160 and the fifth conductive line T5.

In order to make the integrated circuit 150 be electrically connected to the electronic component(s) disposed on another surface of the first substrate 110 (e.g., the display component 122 and the display switching component of the display component layer 120 disposed on the inner surface 110a of the first substrate 110), the electronic device 600 may further include at least one second connection line 660, and the second connection line 660 extends from the side surface 110c of the first substrate 110 to the outer surface 110b of the first substrate 110, so as to be electrically connected to the electronic component(s) on the inner surface 110a of the first substrate 110 and the electronic component(s) on the outer surface 110b of the first substrate 110. Thus, the second connection line 660 may serve as a connection line between the electronic components respectively on two opposite surfaces of the first substrate 110. In some embodiments, the second connection line 660 is outside the adhesive structure AL. Furthermore, referring to FIG. 7 and FIG. 8, the electronic device 600 may further include a plurality of sixth conductive lines T6 disposed on the outer surface 110b of the first substrate 110. In some embodiments, the fifth conductive line T5 and the sixth conductive line T6 may be formed simultaneously by the same manufacturing process, but not limited thereto. In some embodiments, the fifth conductive line T5 and the sixth conductive line T6 belong to different conductive layers respectively. Regarding the electrical connection between the integrated circuit 150 and the component of the display component layer 120, in FIG. 7 and FIG. 8, the second connection line 660 is connected between the sixth conductive line T6 and the first conductive line T1, the sixth conductive line T6 is connected between the integrated circuit 150 and the second connection line 660. Therefore, the integrated circuit 150 may be electrically connected to the display component 122 through the sixth conductive line T6, the second connection line 660, the first conductive line T1 and the display switching component in sequence, but not limited thereto. In some embodiments, the connection between the sixth conductive lines T6 and the second connection lines 660 may be one-to-one, but not limited thereto. Similarly, pads may be optionally disposed at two ends of the sixth conductive line T6 to enhance an connecting area between the integrated circuit 150 and the sixth conductive line T6 and an connecting area between the second connection line 660 and the sixth conductive lines T6, thereby increasing the reliability of the connection, but not limited thereto.

Moreover, in FIG. 7, the first connection line 160 may inwardly extend to the inner surface 140a of the second substrate 140, so as to increase the connecting area between the first connection line 160 and the third conductive line T3, but not limited thereto. Also, the second connection line 660 may inwardly extend to the inner surface 110a of the first substrate 110, so as to increase the connecting area between the second connection line 660 and the first conductive line T1, but not limited thereto. In some embodiments, the third conductive line T3 may be electrically connected to the first connection line 160 at a position close to the side surface 140c of the second substrate 140, and the first conductive line T1 may be electrically connected to the second connection line 660 at a position close to the side surface 110c of the first substrate 110, but not limited thereto.

In FIG. 8, the first connection lines 160 and the second connection lines 660 may be arranged alternately, but not limited thereto. The arrangement of the first connection lines 160 and the second connection line 660 on the side surface may be designed based on requirement(s). In addition, the electronic device 600 may optionally include a interconnecting element (such as the interconnecting element 410 shown in FIG. 4) disposed between the first connection line 160 and the third conductive line T3 and/or disposed between the first connection line 160 and the fifth conductive line T5 and/or disposed between the second connection line 660 and the first conductive line T1 and/or disposed between the second connection line 660 and the sixth conductive line T6.

In some embodiments, the circuit board may be bonded to the inner surface 110a or the outer surface 110b of the first substrate 110, but not limited thereto. Moreover, in some embodiments, if the electronic device 600 includes a backlight module (not shown), the integrated circuit 150, the fifth conductive lines T5 and the sixth conductive lines T6 may be disposed on a surface of the backlight module away from the first substrate 110. Thus, the first connection line 160 may extend from the side surface 140c of the second substrate 140 through the side surface 110c of the first substrate 110 and a side surface of the backlight module to the surface of the backlight module away from the first substrate 110, and the second connection line 660 may extend from the side surface 110c of the first substrate 110 through the side surface of the backlight module to the surface of the backlight module away from the first substrate 110. Accordingly, the integrated circuit 150 may be electrically connected to other electronic component(s) through the conductive line(s) (the fifth conductive line T5, the sixth conductive lines T6, the first conductive line T1 and/or the third conductive line T3) and the connection line(s) (the first connection line 160 and/or the second connection line 660). In this case, the circuit board may be optionally bonded to the surface of the backlight module away from the first substrate 110, but not limited thereto.

Figure 9:
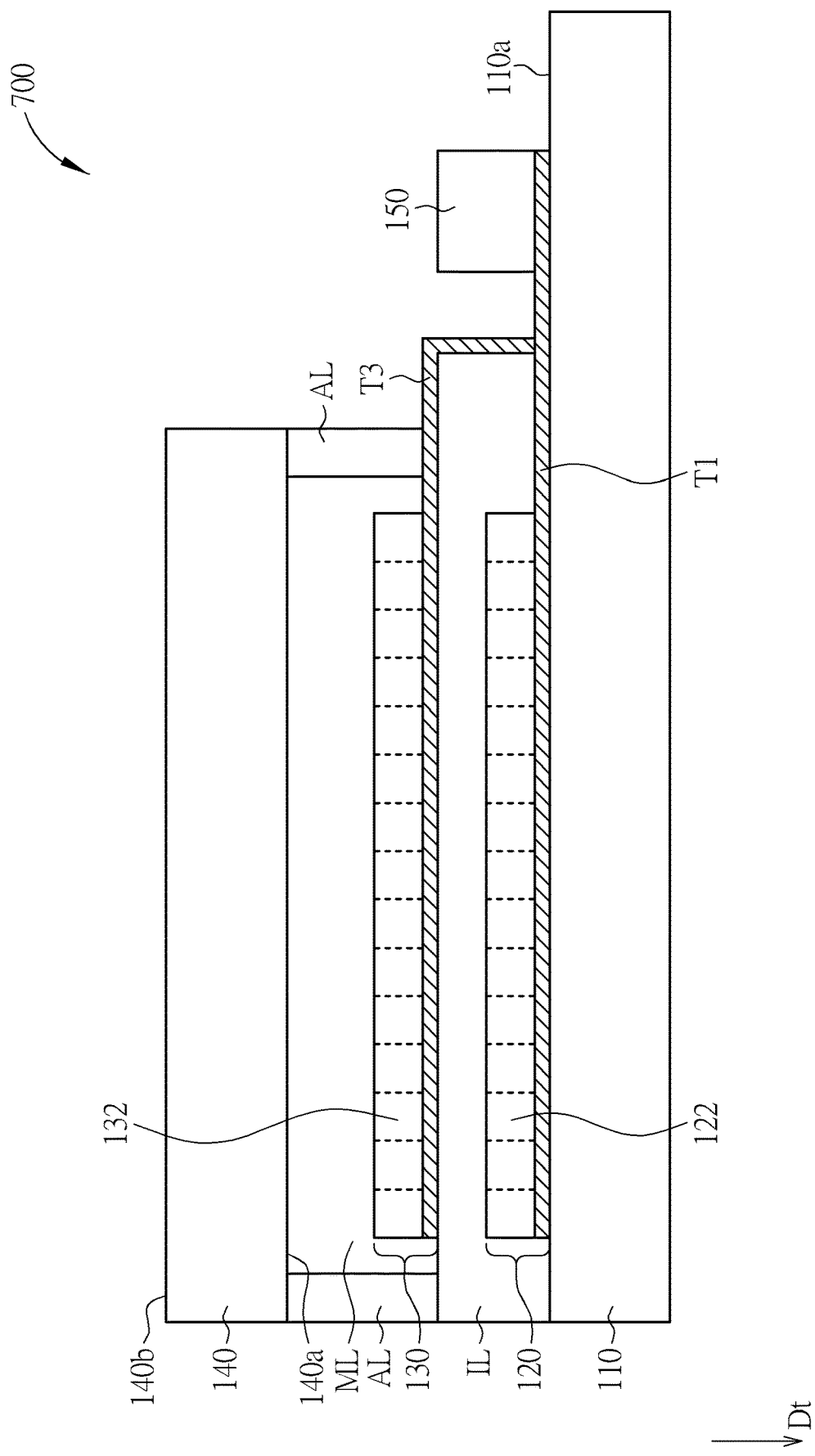
FIG. 9 is a schematic diagram showing a cross-sectional view of an electronic device according to a seventh embodiment of the present disclosure.

Referring to FIG. 9, FIG. 9 is a schematic diagram showing a cross-sectional view of an electronic device according to a seventh embodiment of the present disclosure. As shown in FIG. 9, a difference between the first embodiment and this embodiment is that the fingerprint sensing component layer 130 of the electronic device 700 of this embodiment is disposed on the first substrate 110. In FIG. 9, the fingerprint sensing component layer 130 is disposed on the display component layer 120, an insulating layer IL separates the fingerprint sensing component layer 130 and the display component layer 120, and the integrated circuit 150 is electrically connected to the component(s) of the fingerprint sensing component layer 130 through the third conductive lines T3, but not limited thereto. In some embodiments, the material of the first conductive line T1 may be the same as or different from the material of the third conductive line T3. In some embodiments, the display component layer 120 may be disposed on the fingerprint sensing component layer 130, and the display component layer 120 is separated from the fingerprint sensing component layer 130 by the insulating layer IL, but not limited thereto.

In some embodiments, the second substrate 140, the adhesive structure AL and the medium layer ML shown in FIG. 9 may be removed, such that the electronic device 700 may be a structure having single substrate. In this case, the electronic device 700 may include an organic light emitting diode display panel (OLED display panel), an inorganic light emitting diode display panel (such as an LED display panel), a quantum-dot display panel or any other suitable display panel.

Figure 10:
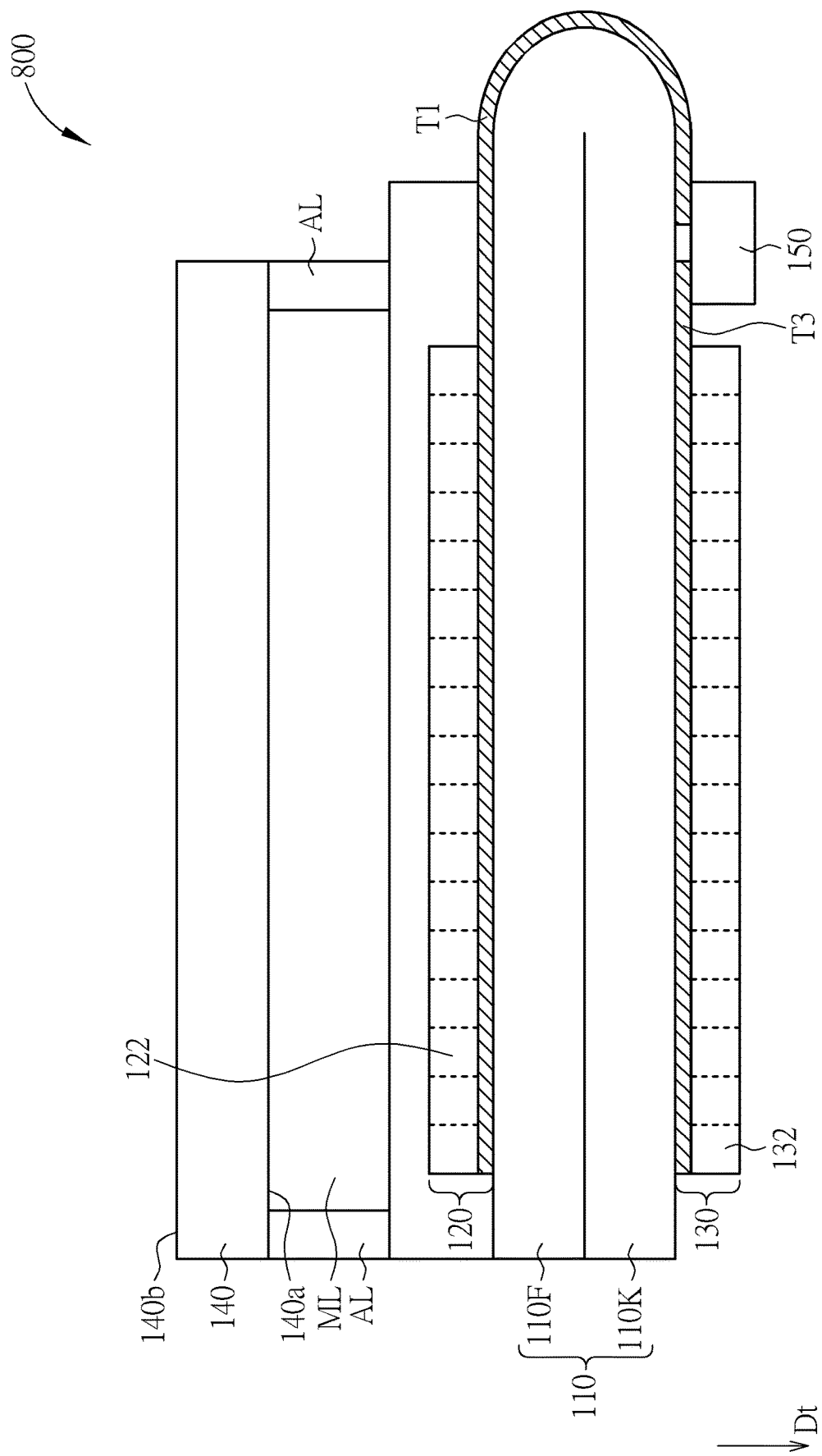
FIG. 10 is a schematic diagram showing a cross-sectional view of an electronic device according to an eighth embodiment of the present disclosure.
Figure 11:
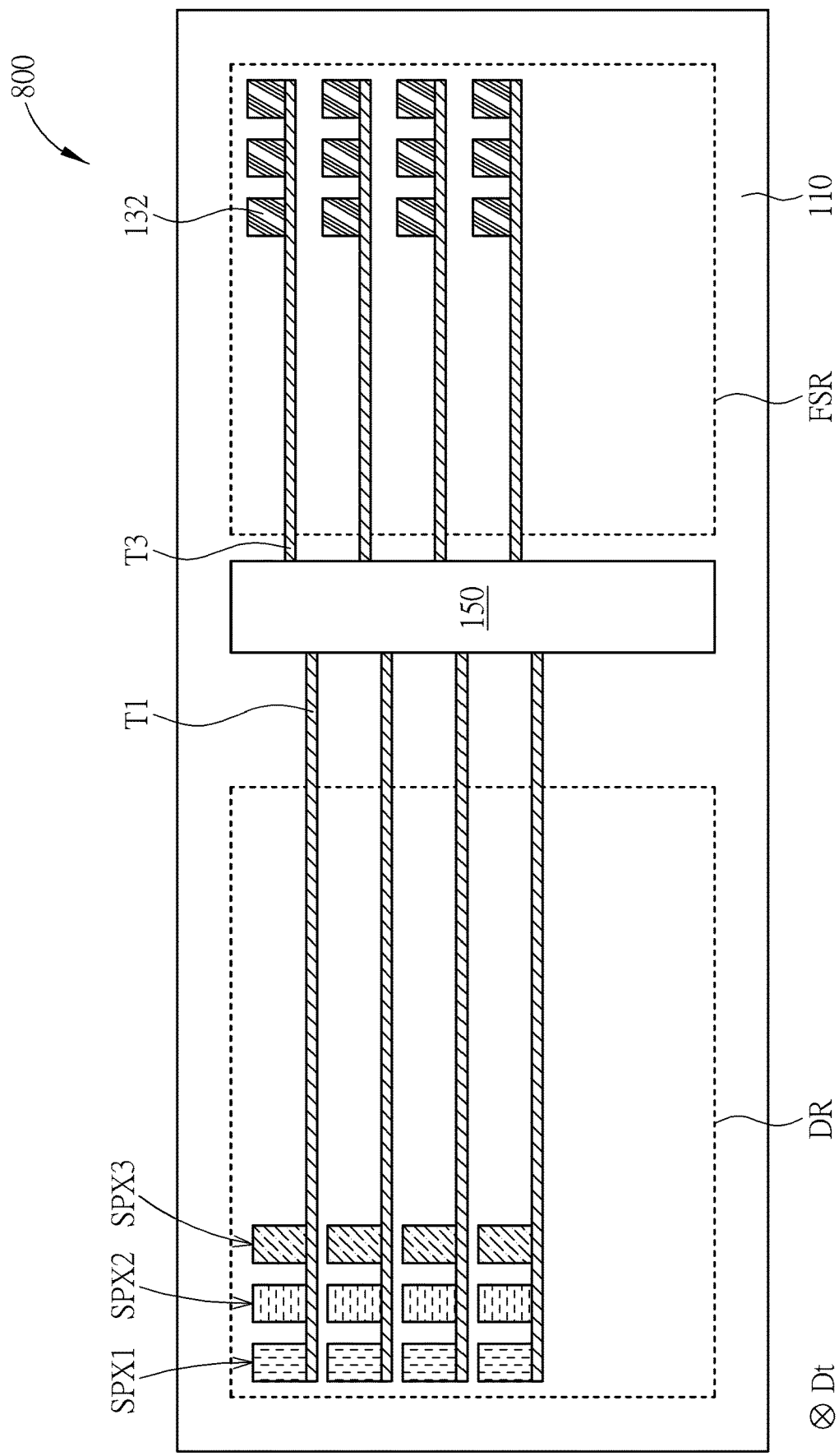
FIG. 11 is a schematic diagram showing a top view of the electronic device before bent according to the eighth embodiment of the present disclosure.

Referring to FIG. 10 and FIG. 11, FIG. 10 is a schematic diagram showing a cross-sectional view of an electronic device according to an eighth embodiment of the present disclosure, and FIG. 11 is a schematic diagram showing a top view of the electronic device before bending according to the eighth embodiment of the present disclosure, wherein FIG. 11 only shows some sub-pixels (the sub-pixel SPX1, the sub-pixel SPX2 and the sub-pixel SPX3) and some fingerprint sensing units 132 to make the figure clear. As shown in FIG. 10, a difference between the seventh embodiment and this embodiment is that the first substrate 110 of the electronic device 800 of this embodiment is a flexible substrate, wherein the bent first substrate 110 may be divided into a front board portion 110F and a back board portion 110K, and the display component layer 120 and the fingerprint sensing component layer 130 are disposed on different portions of the first substrate 110 respectively. For instance, in FIG. 10, the display component layer 120 may be disposed on the front board portion 110F of the first substrate 110, and the fingerprint sensing component layer 130 may be disposed on the back board portion 110K of the first substrate 110, wherein the display component layer 120 may display the display image upwardly (i.e., the display component layer 120 displays the display image along a direction toward the second substrate 140 in FIG. 10), and the fingerprint sensing component layer 130 may sense upwardly (i.e., the fingerprint sensing component layer 130 senses along a direction toward the second substrate 140 in FIG. 10) or downwardly (i.e., the fingerprint sensing component layer 130 senses along a direction away from the second substrate 140 in FIG. 10), but not limited thereto. Moreover, in FIG. 10, the integrated circuit 150 may be disposed on the back board portion 110K of the first substrate 110, but not limited thereto. In FIG. 10 and FIG. 11, the size of the display region DR may be the same as or different from the size of the fingerprint sensing region FSR. In addition, the corresponding relation between the fingerprint sensing units 132 and the sub-pixels (the sub-pixel SPX1, the sub-pixel SPX2 and the sub-pixel SPX3), the density of the fingerprint sensing units 132 and the number of the fingerprint sensing units 132 may be designed based on requirement(s).

Figure 12:
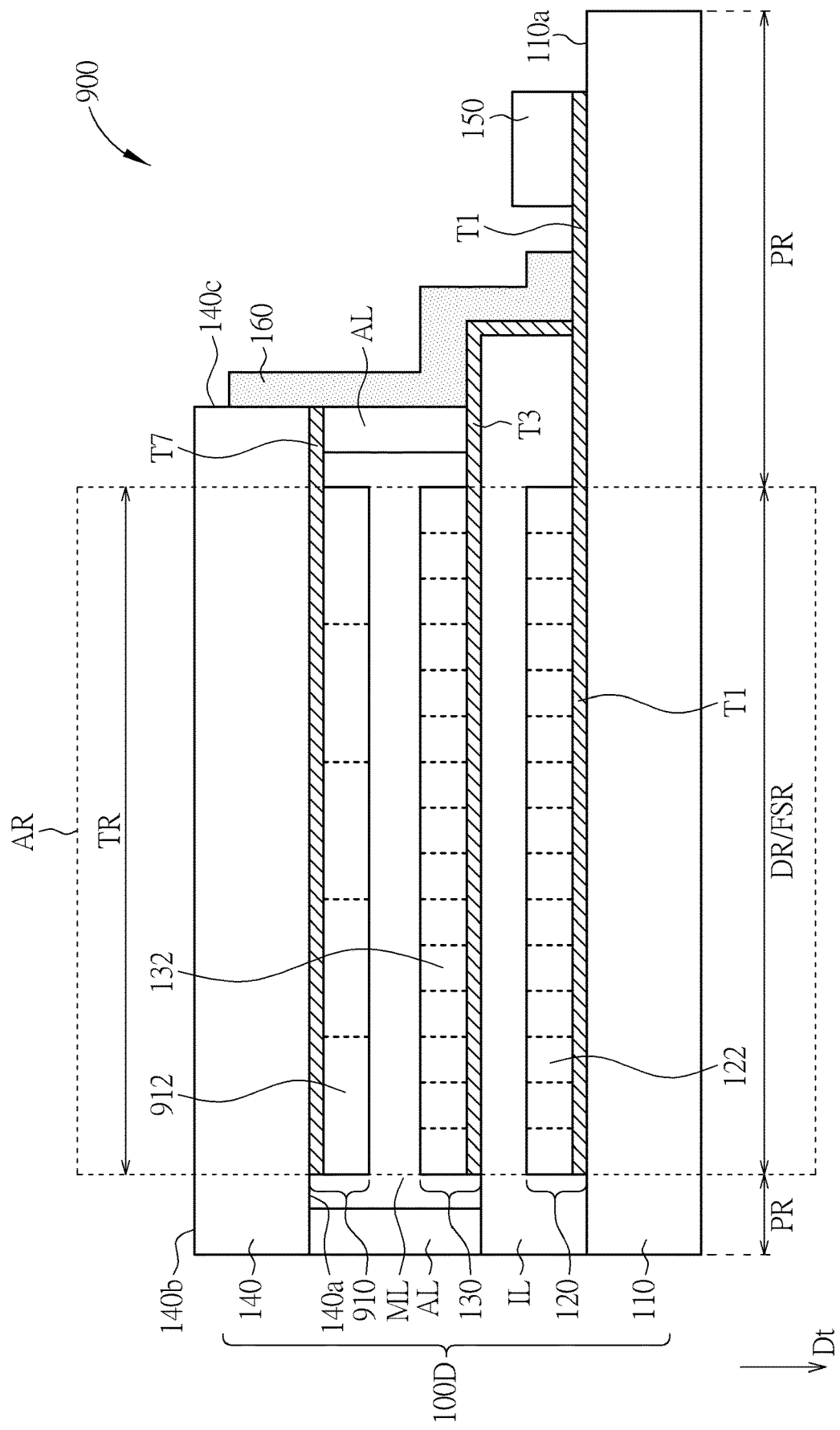
FIG. 12 is a schematic diagram showing a cross-sectional view of an electronic device according to a ninth embodiment of the present disclosure.
Figure 13:
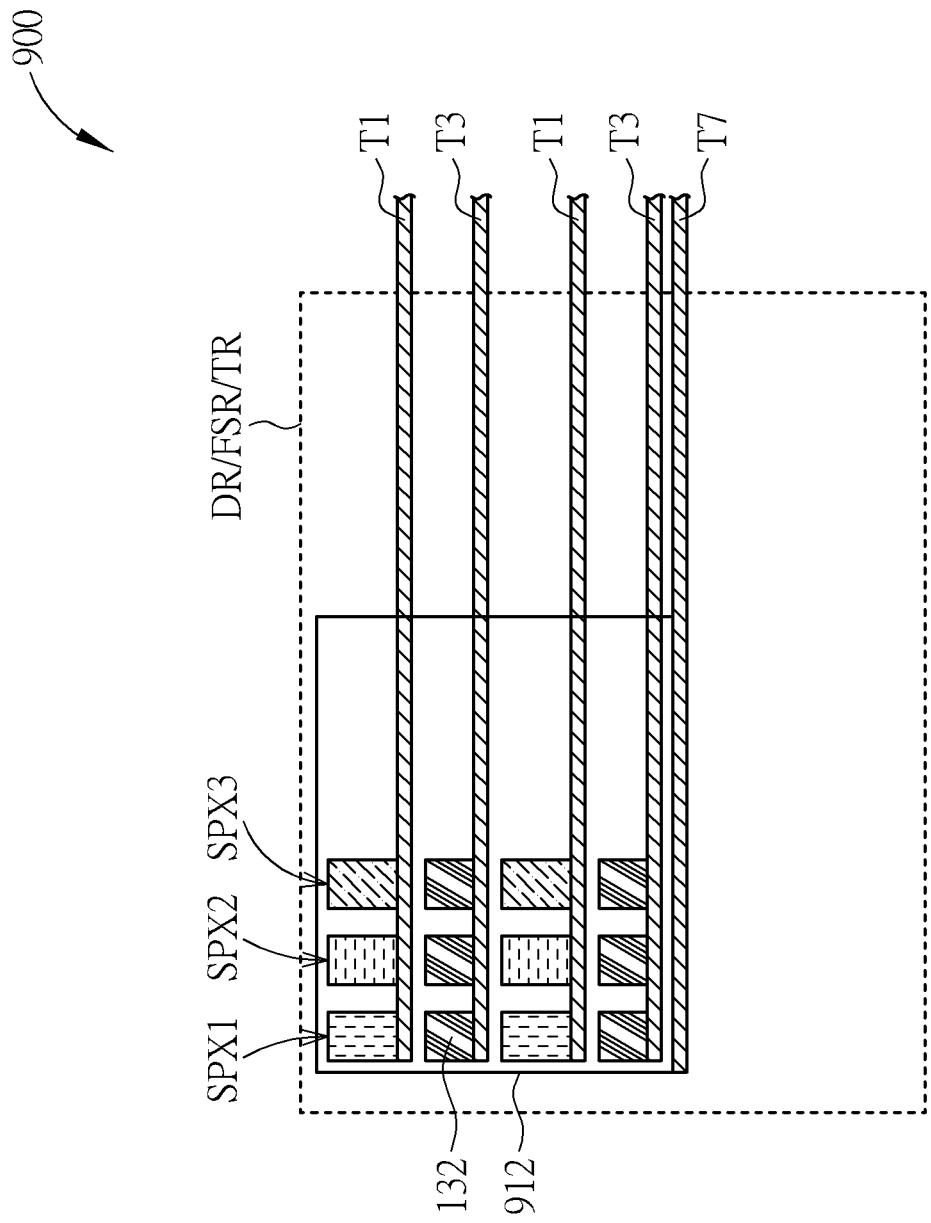
FIG. 13 is a schematic diagram showing a top view of the electronic device according to the ninth embodiment of the present disclosure.

Referring to FIG. 12 and FIG. 13, FIG. 12 is a schematic diagram showing a cross-sectional view of an electronic device according to a ninth embodiment of the present disclosure, and FIG. 13 is a schematic diagram showing a top view of the electronic device according to the ninth embodiment of the present disclosure, wherein FIG. 13 only shows some components in the active region AR to make the figure clear. As shown in FIG. 12 and FIG. 13, a difference between the seventh embodiment and this embodiment is that the electronic device 900 of this embodiment further includes a touch sensing component layer 910 to generate touch sensing signals to recognize a position or a motion of a touch element (e.g., a touch pen, finger(s), etc.). In some embodiments, the touch sensing component layer 910 may be disposed on the outer surface 140b or the inner surface 140a of the second substrate 140 (in FIG. 12, the touch sensing component layer 910 is disposed on the inner surface 140a of the second substrate 140), and the fingerprint sensing component layer 130 and the display component layer 120 may be disposed on the first substrate 110, but not limited thereto. A size of a touch sensing region TR of the active region AR may be determined by the touch sensing component layer 910, wherein the fingerprint sensing region FSR, the display region DR and the touch sensing region TR may overlap or not overlap, and the size of the touch sensing region TR may be greater than, less than or equal to the size of the display region DR. For example, in some embodiments (as shown in FIGS. 12 and 13), the fingerprint sensing region FSR, the display region DR and the touch sensing region TR may overlap, and the fingerprint sensing region FSR, the display region DR and the touch sensing region TR have the same size, but not limited thereto. In addition, the touch sensing component layer 910 may include at least one conductive layer, any other suitable layer or a combination thereof, so as to form a plurality of touch sensing units 912. For instance, the touch sensing unit 912 may be a transparent conductive electrode, but not limited thereto. In some embodiments, the touch sensing unit 912 may use a capacitive method to sense; for instance, the touch sensing unit 912 may be a self-capacitance sensing unit or a mutual-capacitance sensing unit, but not limited thereto. In some embodiments, the touch sensing unit 912 may use any other suitable method to sense. Furthermore, in some embodiments, the electronic device 900 may include an in-cell touch display panel. In other words, the touch sensing unit 912 may serve as such as a common electrode during a display period, and perform the touch sensing function during a touch sensing period.

The plurality of the conductive lines of the electronic device 900 may further include a plurality of seventh conductive lines T7 disposed on the second substrate 140, and each of the seventh conductive lines T7 is electrically between the integrated circuit 150 disposed on the first substrate 110 and the touch sensing unit 912. Note that the number of the integrated circuit 150 and the function of the integrated circuit 150 may be designed based on requirement(s). In some embodiments, the electronic device 900 may include one integrated circuit 150 having a function for controlling the display image, a function for controlling the fingerprint identification and a function for controlling the touch sensing. Thus, this integrated circuit 150 may be electrically connected to and drive the display components 122, the fingerprint sensing units 132 and the touch sensing units 912, but not limited thereto.

In FIG. 12, in order to make the touch sensing unit 912 disposed on the second substrate 140 be electrically connected to the integrated circuit 150 disposed on the first substrate 110, the first connection line 160 is electrically connected between the touch sensing unit 912 and the integrated circuit 150. Furthermore, in FIG. 12, the plurality of the conductive lines of the electronic device 900 may further include a plurality of eighth conductive lines (not shown in figures) disposed on the inner surface 110a of the first substrate 110, wherein the first connection line 160 is connected between the seventh conductive line T7 and the eighth conductive line, and the eighth conductive line is connected between the first connection line 160 and the integrated circuit 150, such that the integrated circuit 150 may be electrically connected to the touch sensing unit 912 through the eighth conductive line, the first connection line 160 and the seventh conductive line T7 in sequence. That is to say, the touch sensing unit 912 is electrically connected to the integrated circuit 150 through the first connection line 160 on the side surface 140c of the second substrate 140. In some embodiments (as shown in FIG. 12), the eighth conductive line and at least a part of the first conductive line T1 may be formed simultaneously by the same manufacturing process, and/or the eighth conductive line and at least a part of the third conductive line T3 may be formed simultaneously by the same manufacturing process, but not limited thereto. In some embodiments, the first conductive line T1, the third conductive line 13 and the eighth conductive line belong to different conductive layers. In some embodiments, the connection between the eighth conductive lines and the first connection lines 160 may be one-to-one, but not limited thereto. Note that, a pad may be optionally disposed at an end of the seventh conductive line T7 to enhance a connecting area between the first connection line 160 and the seventh conductive line T7. In an embodiment, pads may be optionally disposed at two ends of the eighth conductive line to enhance an connecting area between the integrated circuit 150 and the eighth conductive line and an connecting area between the first connection line 160 and the eighth conductive line, thereby increasing the reliability of the electrical connection, but not limited thereto. In addition, a needed circuit may be optionally disposed between the first connection line 160 and the seventh conductive lines T7, and this circuit may be such as a signal amplifying circuit and/or a demultiplexer, but not limited thereto. Note that, in order to make the figure clear, FIG. 12 omits an insulating layer between the first connection line 160 and the third conductive line T3. In other words, in FIG. 12, the first connection line 160 is not in contact with the third conductive line T3 directly. Furthermore, the first connection line 160 is not in contact with the first conductive line T1 directly.

The disposition of the display component layer 120, the fingerprint sensing component layer 130 and the touch sensing component layer 910 may be adjusted based on designed requirement(s), and the disposed order is not limited by the above content. In some embodiments (not shown in figures), on the first substrate 110, the display component layer 120 may be disposed on the fingerprint sensing component layer 130, and the display component layer 120 and the fingerprint sensing component layer 130 are separated by the insulating layer IL, but not limited thereto. In some embodiments (not shown in figures), the position of the touch sensing component layer 910 and the position of the fingerprint sensing component layer 130 may be exchanged (i.e., the fingerprint sensing component layer 130 is disposed on the second substrate 140, and the touch sensing component layer 910 and the display component layer 120 are disposed on the first substrate 110), but not limited thereto. In some embodiments (not shown in figures), the display component layer 120, the fingerprint sensing component layer 130 and the touch sensing component layer 910 are disposed on the first substrate 110, and the display component layer 120, the fingerprint sensing component layer 130 and the touch sensing component layer 910 may overlap or may not overlap. The stacking order of the display component layer 120, the fingerprint sensing component layer 130 and the touch sensing component layer 910 may be changed based on designed requirement(s). For instance, in some embodiments, the display component layer 120, the fingerprint sensing component layer 130 and the touch sensing component layer 910 may be stacked in sequence; in some embodiments, the fingerprint sensing component layer 130 and the touch sensing component layer 910 may be disposed on the display component layer 120, but the fingerprint sensing component layer 130 is disposed on a side of the touch sensing component layer 910, and the fingerprint sensing component layer 130 does not overlap the touch sensing component layer 910, but not limited thereto.

In FIG. 12 and FIG. 13, in the normal direction Dt, one touch sensing unit 912 may be corresponding to a plurality of the fingerprint sensing units 132 and a plurality of the sub-pixels (a plurality of the display components 122), which include the sub-pixel(s) SPX1, the sub-pixel(s) SPX2 and/or the sub-pixel(s) SPX3. In some embodiments, the fingerprint sensing unit 132 does not overlap the sub-pixel SPX1, the sub-pixel SPX2 and the sub-pixel SPX3 (the display components 122) in the normal direction Dt, but not limited thereto. In FIG. 13, one fingerprint sensing unit 132 may correspond to one sub-pixel in the top view, but not limited thereto. Moreover, as shown in FIG. 13, the first conductive lines T1, the third conductive lines T3 and the seventh conductive lines T7 may be substantially parallel to each other, but not limited thereto. The extending direction of the conductive line may be adjusted based on designed requirement(s). For example, these conductive lines may overlap in the normal direction Dt and/or not be parallel to each other.

Figure 14:
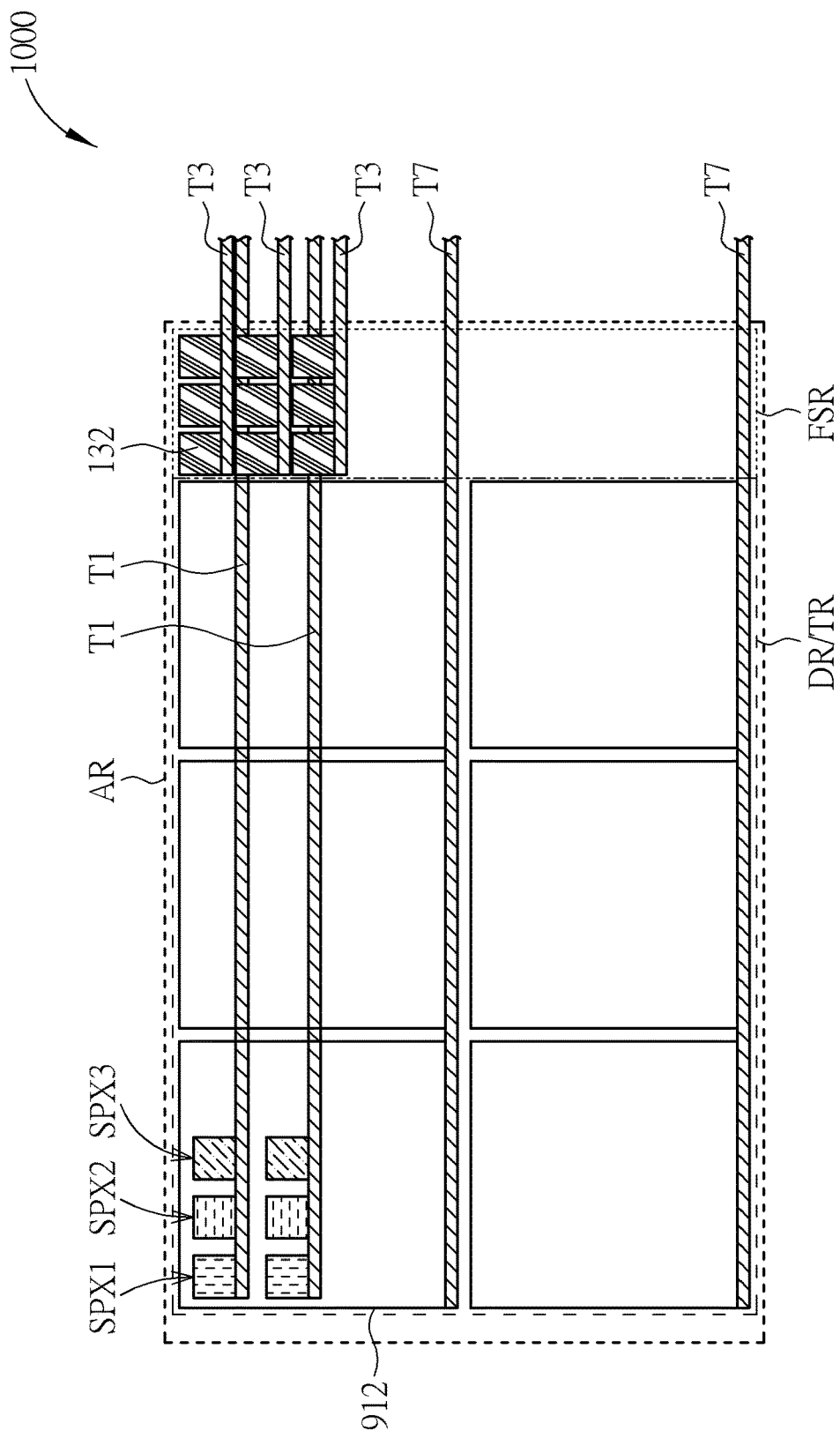
FIG. 14 is a schematic diagram showing a top view of an electronic device according to a tenth embodiment of the present disclosure.

Referring to FIG. 14, FIG. 14 is a schematic diagram showing a top view of an electronic device according to a tenth embodiment of the present disclosure, wherein FIG. 14 only shows some components in the active region AR, so as to make the figure clear. As shown in FIG. 14, a difference between the ninth embodiment and this embodiment is the disposition of the regions in the active region AR of the electronic device 1000 of this embodiment. The display region DR overlap the touch sensing region TR in the normal direction Dt, and the fingerprint sensing region FSR does not overlap the touch sensing region TR and the display region DR in the normal direction Dt. That is to say, the fingerprint sensing unit 132 does not overlap the touch sensing unit 912 and the display component 122 (the sub-pixel SPX1, the sub-pixel SPX2 and the sub-pixel SPX3) in the normal direction Dt, but not limited thereto. In FIG. 14, the fingerprint sensing unit 132 is disposed on a side of the touch sensing unit 912 and the display component 122 (the sub-pixel SPX1, the sub-pixel SPX2 and the sub-pixel SPX3), but not limited thereto.

In summary, according to some embodiments, the electronic device includes the display function and the biometric function (such as identification of the fingerprint and/or the palm print), and may optionally include the touch sensing function. In some embodiments, the integrated circuit has multiple functions that can drive the display panel and the fingerprint sensing unit, so as to decrease the number of the integrated circuit(s). In some embodiments, the electronic device may have the connection line(s) on the side surface of the substrate, such that the electronic components disposed on different substrates may be electrically connected to each other.

Although the embodiments and their advantages of the present disclosure have been described as above, it should be understood that any person having ordinary skill in the art can make changes, substitutions, and modifications without departing from the spirit and scope of the present disclosure. In addition, the protecting scope of the present disclosure is not limited to the processes, machines, manufactures, material compositions, devices, methods and steps in the specific embodiments described in the description. Any person having ordinary skill in the art can understand the current or future developed processes, machines, manufactures, material compositions, devices, methods and steps from the content of the present disclosure, and then, they can be used according to the present disclosure as long as the same functions can be implemented or the same results can be achieved in the embodiments described herein. Thus, the protecting scope of the present disclosure includes the above processes, machines, manufactures, material compositions, devices, methods and steps. Moreover, each claim constitutes an individual embodiment, and the protecting scope of the present disclosure also includes the combination of each claim and each embodiment. The protecting scope of the present disclosure shall be determined by the appended claims.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
   a display panel comprising:
      a first substrate;
      a second substrate opposite to the first substrate;
      a display component disposed on an inner surface of the first substrate;
      a fingerprint sensing unit disposed on the inner surface of the first substrate; and
      a touch sensing unit disposed on an inner surface the second substrate;
   an integrated circuit for driving the display component, the fingerprint sensing unit and the touch sensing unit;
   a connection line disposed on a side surface of the second substrate, wherein the touch sensing unit is electrically connected with the integrated circuit through the connection line; and
   a backlight module, wherein the first substrate is disposed between the backlight module and the second substrate,
   wherein a distance between the display component and the inner surface of the first substrate is less than a distance between the display component and the inner surface of the second substrate, and a distance between the fingerprint sensing unit and the inner surface of the first substrate is less than a distance between the fingerprint sensing unit and the inner surface of the second substrate.

2. The electronic device according to claim 1, wherein the connection line is directly in contact with the side surface of the second substrate.

3. The electronic device according to claim 2, wherein a portion of the connection line overlaps the inner surface of the second substrate in a normal direction of the first substrate.

4. The electronic device according to claim 1, wherein the connection line is disposed on a side surface of the first substrate.

5. The electronic device according to claim 4, wherein the connection line is directly in contact with the side surface of the second substrate and the side surface of the first substrate.

6. The electronic device according to claim 1, further comprising another connection line disposed on a side surface of the first substrate, wherein the display component is electrically connected with the integrated circuit through the another connection line.

7. The electronic device according to claim 1, wherein the connection line is formed by printing, coating or adhering.

8. The electronic device according to claim 1, wherein the first substrate is disposed between the second substrate and the integrated circuit.

9. The electronic device according to claim 1, wherein the display panel comprises an insulating layer, the display component comprises a pixel electrode, and the insulating layer is disposed between the pixel electrode and the fingerprint sensing unit in a normal direction of the first substrate.

10. The electronic device according to claim 9, wherein the display component further comprises a common electrode, and the insulating layer is disposed between the common electrode and the fingerprint sensing unit in the normal direction of the first substrate.

11. The electronic device according to claim 1, wherein the fingerprint sensing unit comprises a photoelectric conversion unit.

12. The electronic device according to claim 11, wherein the photoelectric conversion unit comprises a PIN diode.

13. The electronic device according to claim 1, wherein the connection line is made of conductive material.

14. The electronic device according to claim 1, wherein the display panel comprises:
   a light shielding layer disposed on the inner surface of the second substrate, wherein the light shielding layer comprises an opening, the opening defines a region of a sub-pixel, and the display component is disposed within the region of the sub-pixel; and
   a light converting layer disposed in the opening of the light shielding layer.

15. The electronic device according to claim 14, wherein the display component comprises a first semiconductor layer, the fingerprint sensing unit comprises a second semiconductor layer, and the first semiconductor layer and the second semiconductor layer are different layers.

16. The electronic device according to claim 15, further comprising a medium layer, wherein the medium layer is disposed between the fingerprint sensing unit and the touch sensing unit.

17. The electronic device according to claim 1, wherein the integrated circuit is disposed on the inner surface of the first substrate.

18. The electronic device according to claim 17, wherein the connection line comprises a first portion and a second portion connected to the first portion, the first portion is disposed on the side surface of the second substrate, and the second portion is disposed on the inner surface of the first substrate and extends to and electrically connects to the integrated circuit.

19. The electronic device according to claim 18, wherein the display panel comprises:
   a light shielding layer disposed on the inner surface of the second substrate, wherein the light shielding layer comprises an opening, the opening defines a region of a sub-pixel, and the display component is disposed within the region of the sub-pixel; and
   a light converting layer disposed in the opening of the light shielding layer.

20. The electronic device according to claim 19, wherein the display component comprises a first semiconductor layer, the fingerprint sensing unit comprises a second semiconductor layer, and the first semiconductor layer and the second semiconductor layer are different layers.

* * * * *